United States Patent
Slusar

(10) Patent No.: US 9,355,423 B1
(45) Date of Patent: May 31, 2016

(54) REWARD SYSTEM RELATED TO A VEHICLE-TO-VEHICLE COMMUNICATION SYSTEM

(71) Applicant: Allstate Insurance Company, Northbrook, IL (US)

(72) Inventor: Mark V. Slusar, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 9 days.

(21) Appl. No.: 14/163,741

(22) Filed: Jan. 24, 2014

(51) Int. Cl.
*G06Q 40/00* (2012.01)
*G06Q 40/08* (2012.01)
*G06Q 20/32* (2012.01)
*G08G 1/00* (2006.01)

(52) U.S. Cl.
CPC .............. *G06Q 40/08* (2013.01); *G06Q 20/327* (2013.01); *G08G 1/22* (2013.01)

(58) Field of Classification Search
CPC ....... G06Q 10/00; G06Q 20/00; G06Q 30/00; G06Q 40/00
USPC ...................................... 705/3–44
See application file for complete search history.

(56) References Cited

U.S. PATENT DOCUMENTS

| 4,119,166 | A | 10/1978 | Ayotte |
| 4,622,636 | A | 11/1986 | Tachibana |
| 5,053,964 | A | 10/1991 | Mister |
| 5,295,551 | A | 3/1994 | Sukonick |
| 5,572,449 | A | 11/1996 | Tang |
| 5,680,122 | A | 10/1997 | Mio |
| 5,710,565 | A | 1/1998 | Shirai |
| 5,797,134 | A | 8/1998 | McMillan et al. |
| 6,116,369 | A | 9/2000 | King |
| 6,128,559 | A | 10/2000 | Saitou |
| 6,188,950 | B1 | 2/2001 | Tsutsumi |
| 6,301,530 | B1 | 10/2001 | Tamura |
| 6,389,351 | B1 | 5/2002 | Egawa |
| 6,415,226 | B1 | 7/2002 | Kozak |
| 6,502,035 | B2 | 12/2002 | Levine |
| 6,647,328 | B2 | 11/2003 | Walker |
| 6,675,094 | B2 | 1/2004 | Russell |

(Continued)

FOREIGN PATENT DOCUMENTS

| CN | 101131588 A | 2/2008 |
| DE | 102010001006 A1 | 7/2011 |

(Continued)

OTHER PUBLICATIONS

Light, Donald, "A Scenario: The End of Auto Insurance," May 8, 2012, downloaded Nov. 11, 2013 from ww.celent.com/reports/scenario-end-auto-insurance, 2 pages.

(Continued)

*Primary Examiner* — Frantzy Poinvil
(74) *Attorney, Agent, or Firm* — Banner & Witcoff, Ltd.

(57) ABSTRACT

System and methods are disclosed for determining, through vehicle-to-vehicle communication, whether vehicles are involved in autonomous droning. Vehicle driving data and other information may be used to calculate a autonomous droning reward amount. In addition, vehicle involved in a drafting relationship in addition to, or apart from, an autonomous droning relationship may be financially rewarded. Moreover, aspects of the disclosure related to determining ruminative rewards and/or aspects of vehicle insurance procurement/underwriting.

16 Claims, 9 Drawing Sheets

(56) References Cited

U.S. PATENT DOCUMENTS

| | | | |
|---|---|---|---|
| 6,707,378 | B2 | 3/2004 | MacNeille et al. |
| 6,732,024 | B2 | 5/2004 | Wilhelm Rekow |
| 6,780,077 | B2 | 8/2004 | Baumgartner |
| 6,982,635 | B2 | 1/2006 | Obradovich |
| 7,116,248 | B2 | 10/2006 | Lu et al. |
| 7,286,825 | B2 | 10/2007 | Shishido et al. |
| 7,304,589 | B2 | 12/2007 | Kagawa |
| 7,315,239 | B2 | 1/2008 | Cheng et al. |
| 7,339,483 | B1 | 3/2008 | Farmer |
| 7,610,210 | B2 | 10/2009 | Helitzer et al. |
| 7,650,211 | B2 | 1/2010 | Wang et al. |
| 7,660,725 | B2 * | 2/2010 | Wahlbin et al. ............ 705/4 |
| 7,664,589 | B2 | 2/2010 | Etori et al. |
| 7,739,087 | B2 | 6/2010 | Qiu |
| 7,805,321 | B2 * | 9/2010 | Wahlbin et al. ............ 705/4 |
| 7,821,421 | B2 | 10/2010 | Tamir et al. |
| 7,966,118 | B2 | 6/2011 | Kade |
| 7,991,629 | B2 | 8/2011 | Gay et al. |
| 8,031,062 | B2 | 10/2011 | Smith |
| 8,065,169 | B1 | 11/2011 | Oldham et al. |
| 8,078,349 | B1 | 12/2011 | Prada Gomez |
| 8,078,382 | B2 | 12/2011 | Sugano |
| 8,086,523 | B1 | 12/2011 | Palmer |
| 8,090,598 | B2 | 1/2012 | Bauer et al. |
| 8,139,109 | B2 | 3/2012 | Schmiedel |
| 8,145,393 | B2 | 3/2012 | Foster |
| 8,152,589 | B2 | 4/2012 | Bowen |
| 8,160,809 | B2 | 4/2012 | Farwell |
| 8,180,655 | B1 | 5/2012 | Hopkins, III |
| 8,229,618 | B2 | 7/2012 | Tolstedt |
| 8,280,308 | B2 | 10/2012 | Anschutz |
| 8,290,701 | B2 | 10/2012 | Mason |
| 8,314,718 | B2 | 11/2012 | Muthaiah et al. |
| 8,326,473 | B2 | 12/2012 | Simpson |
| 8,335,607 | B2 | 12/2012 | Gatten |
| 8,352,112 | B2 | 1/2013 | Mudalige |
| 8,407,139 | B1 | 3/2013 | Palmer |
| 8,457,827 | B1 | 6/2013 | Ferguson |
| 8,457,892 | B2 | 6/2013 | Aso |
| 8,538,785 | B2 | 9/2013 | Coleman et al. |
| 8,577,703 | B2 | 11/2013 | McClellan |
| 8,595,037 | B1 | 11/2013 | Hyde |
| 8,620,693 | B1 | 12/2013 | Schumann, Jr. |
| 8,639,535 | B1 | 1/2014 | Kazenas |
| 8,686,844 | B1 | 4/2014 | Wine |
| 8,750,306 | B2 | 6/2014 | Yousefi et al. |
| 2002/0178033 | A1 | 11/2002 | Yoshioka |
| 2003/0187704 | A1 * | 10/2003 | Hashiguchi et al. ........ 705/4 |
| 2004/0103006 | A1 * | 5/2004 | Wahlbin et al. ............ 705/4 |
| 2004/0103010 | A1 * | 5/2004 | Wahlbin et al. ............ 705/4 |
| 2004/0153362 | A1 | 8/2004 | Bauer et al. |
| 2006/0161341 | A1 | 7/2006 | Haegebarth |
| 2006/0221328 | A1 | 10/2006 | Rouly |
| 2007/0136107 | A1 | 6/2007 | Maguire |
| 2008/0059007 | A1 | 3/2008 | Whittaker |
| 2008/0091309 | A1 | 4/2008 | Walker |
| 2008/0243558 | A1 | 10/2008 | Gupte |
| 2008/0319602 | A1 | 12/2008 | McClellan et al. |
| 2009/0079839 | A1 | 3/2009 | Fischer |
| 2010/0030586 | A1 | 2/2010 | Taylor et al. |
| 2010/0131300 | A1 | 5/2010 | Collopy et al. |
| 2010/0131304 | A1 | 5/2010 | Collopy et al. |
| 2010/0302371 | A1 | 12/2010 | Abrams |
| 2010/0324775 | A1 | 12/2010 | Kermani et al. |
| 2011/0029170 | A1 | 2/2011 | Hyde et al. |
| 2011/0202305 | A1 | 8/2011 | Willis |
| 2011/0210867 | A1 | 9/2011 | Benedikt |
| 2012/0034876 | A1 | 2/2012 | Nakamura et al. |
| 2012/0053808 | A1 | 3/2012 | Arai |
| 2012/0072243 | A1 | 3/2012 | Collins et al. |
| 2012/0083960 | A1 | 4/2012 | Zhu |
| 2012/0101660 | A1 | 4/2012 | Hattori |
| 2012/0123641 | A1 | 5/2012 | Ferrin |
| 2012/0197669 | A1 | 8/2012 | Kote et al. |
| 2012/0290146 | A1 | 11/2012 | Dedes et al. |
| 2013/0013179 | A1 | 1/2013 | Lection |
| 2013/0030606 | A1 | 1/2013 | Mudalige |
| 2013/0037650 | A1 | 2/2013 | Heppe |
| 2013/0052614 | A1 | 2/2013 | Mollicone et al. |
| 2013/0073321 | A1 | 3/2013 | Hofmann et al. |
| 2013/0144657 | A1 | 6/2013 | Ricci |
| 2013/0147638 | A1 * | 6/2013 | Ricci ..................... 340/905 |
| 2013/0179198 | A1 | 7/2013 | Bowne et al. |
| 2013/0198737 | A1 | 8/2013 | Ricci |
| 2013/0198802 | A1 | 8/2013 | Ricci |
| 2013/0200991 | A1 | 8/2013 | Ricci et al. |
| 2013/0203400 | A1 | 8/2013 | Ricci |
| 2013/0204645 | A1 | 8/2013 | Lehman et al. |
| 2013/0212659 | A1 | 8/2013 | Maher et al. |
| 2013/0218603 | A1 | 8/2013 | Hagelstein et al. |
| 2013/0218604 | A1 | 8/2013 | Hagelstein et al. |
| 2013/0250933 | A1 | 9/2013 | Yousefi et al. |
| 2013/0304514 | A1 | 11/2013 | Hyde |
| 2014/0074512 | A1 | 3/2014 | Hare et al. |
| 2014/0080098 | A1 | 3/2014 | Price |
| 2014/0272810 | A1 | 9/2014 | Fields et al. |

FOREIGN PATENT DOCUMENTS

| | | | |
|---|---|---|---|
| EP | 1296305 | A1 | 3/2003 |
| EP | 2293255 | A1 | 3/2011 |
| EP | 2471694 | A2 | 7/2012 |
| WO | 0139090 | A1 | 5/2001 |
| WO | 20088067872 | A1 | 6/2008 |
| WO | 2008096376 | | 8/2008 |
| WO | 2012014042 | | 2/2012 |
| WO | 2012150591 | A2 | 11/2012 |
| WO | 2013012926 | A1 | 1/2013 |
| WO | 2013160908 | A2 | 10/2013 |

OTHER PUBLICATIONS

"Driver Assistance Systems," Robert Bosch GmbH, downloaded Oct. 27, 2013 from www.bosch-automotivetechnology.us/en__us/us/driving__comfort__1/driving__comfort__systems__for__passenger__cars__2/driver__assistance__systems__5/driver__assistan ... 12 pages.

"Autonomous Car," Wikipedia, the free encyclopedia, downloaded Nov. 11, 2013 from en.wikipedia.org/wiki/Autonomous__car#cite__ref-28, 20 pages.

"Schlaue Autos von A bis Z." Encyclopedia, downloaded Oct. 27, 2013 from www.bester-beifahrer.de/startseite/lexikon/, 15 pages.

"Chassis Systems Control, Adaptive Cruise Control: More comfortable driving," Robert Bosch GmbH, Brochure downloaded Oct. 26, 2013, 4 pages.

"Get Ready for Automated Cars," Houston Chronicle, Sep. 11, 2012, downloaded Nov. 11, 2013, 1 page.

Levy, Steven, Salmon, Felix, Stokes, Jon, "Artificial Intelligence is Here. In Fact, It's All Around Us. But It's Nothing Like We Expected," Jan. 2011, 14 pages.

"Driverless cars study: 1 in 5 would let computers do the driving," Nov. 4, 2013, downloaded Dec. 19, 2013 from http://www.carinsurance.com/press/driverless-cars-survey-results.aspx, 2 pages.

Shladover, Steven E. "What if Cars Could Drive Themselves," Access Magazine, University of California Transportation Center, UC Berkeley, Apr. 1, 2000, downloaded Dec. 19, 2013, 7 pages.

Kim, Mun Hyun, Dickerson, Julie, Kosko, Bart, "Fuzzy throttle and brake control for platoons of smart cars," University of Southern California, Received May 1995, revised Aug. 1995, downloaded Dec. 19, 2013, 26 pages.

"A velocity control strategy for vehicular collision avoidance system," Abstract downloaded on May 9, 2013 from ieeexplore.ieee.org/xpl/articleDetails.jsp?tp=&arnumber=1626838&contentType=Conference+Publications&queryText%3DA+velocity+control+strategy+for ... , 1 page.

"Fuzzy system representation of car-following phenomena," Abstract downloaded on May 9, 2013 from ieeexplore.ieee.org/xpl/articleDetails.jsp?tp=&arnumber=527798&contentType=Conference+Publications&queryText%3DFuzzy+system+representation+of ... , 1 page.

(56) References Cited

OTHER PUBLICATIONS

"Direct adaptive longitudinal control of vehicle platoons," Abstract downloaded on May 9, 2013 from ieeexplore.ieee.org/xpl/articleDetails.jsp?tp=&arnumber=917908&contentType=Journals+%26+Magazines&queryText%3DDirect+adaptive+longitudinal+c . . . , 1 page.

Sharma, Devansh, "Development of Leader-Follower Robot in IIT Bombay," 4 pages.

Noguchi, Noboru, Will, Jeff, Reid, Joh, and Zhang, Qin, "Development of a master-slave robot system for farm operations," Computers and Electronics in Agriculture 44 (2004), 19 pages.

"Project SARTRE (Safe Road Trains for the Environment)," Road Traffic Technology, downloaded on May 9, 2013 from www.roadtraffic-technology.com/projects/the-sartre-project/, 3 pages.

"A semi-autonomous tractor in an intelligent master-slave vehicle system," Oct. 2010, vol. 3, Issue 4, pp. 263-269, downloaded Dec. 19, 2013 from http://link.springer.com/article/10.1007%2Fs11370-010-0071-6, 4 pages.

"Development of an intelligent master-slave system between agricultural vehicles," Abstract downloaded on Dec. 19, 2013 from http://ieeexplore.ieee.org/xpl/login.jsp?tp=&arnumber=5548056&url=http%3A%2F%2Fi . . . , 1 page.

"A leader-follower formation flight control scheme for UAV helicopters," Abstract downloaded on Dec. 19, 2013 from http://ieeexplore.ieee.org/xpl/login.jsp?tp=&arnumber=4636116&url=http%3A%2F%2Fi . . . , 1 page.

Kurian, Bonny, "Auto-Insurance—Driving into the sunset?", Tala Consultancy Services, 2013.

O'Brien, Christine, "Autonomous Vehicle Technology: Consideration for the Auto Insurance Industry", University Transportation Resource Center (The 2nd Connected Vehicles Symposium, Rutgers University), Jun. 17, 2013.

Anderson, James M. et al., "Autonomous Vehicle Program: A Guide for Policymakers", Rand Corporation: Transportation, Space, and Technology Program, 2014.

Marchant, Gary E. et al., "The Coming Collision Between Autonomous Vehicles and the Liability System", Santa Clara Law Review (vol. 52: No. 4 (Article 6)), Dec. 17, 2012.

"The Munix Advantage", AUMA, retrieved Apr. 8, 2014, <http://www.auma.ca/live/digitalAssets/71/71248_MUNIX_onepager.pdf>.

"The Use of Occupation and Education Factors in Automobile Insurance", State of New Jersey: Department of Banking and Insurance, Apr. 2008.

"Preliminary Statement of Policy Concerning Automated Vehicles", National Highway Traffic Safety Administration, retrieved Jun. 9, 2014.

Walker Smith, Bryant, "Summary of levels of Driving Automation for On-Road Vehicles", Stanford Law School: The Center for Internet and Society, Dec. 18, 2013, <http://cyberlaw.stanford.edu/blog/2013/121sae-levels-driving-automation>.

Auto Insurance Discounts, Liberty Mutual Insurance, downloaded from http://www.libertymutual.com/auto-insurance/auto-insurance-coverage/auto-insurance-discounts, Jan. 8, 2014, 2 pages.

Autonomous Vehicles Regulations, California Department of Motor Vehicles, 2011, downloaded from www.dmv.ca.gov/vr/autonomous/auto.htm, Jan. 2, 2014, 3 pages.

Sharma, Aroma, Autonomous Vehicle Conf Recap 2012: "Driving the Future: The Legal Implications of Autonomous Vehicles," High Tech Law Institute, downloaded from law.scu.edu/hightech/autonomousvehicleconfrecap2012/, Jan. 2, 2014, 2 pages.

Strumpf, Dan, "Corporate News: Driverless Cars Face Issues of Liability", Strumpf Dan, The Wall Street Journal Asia [Hong Kong] Jan. 29, 2013: 19, downloaded from http://search.proquest.com.ezproxy, Jan. 8, 2014, 2 pages.

Lienert, Anita, Drivers Would Opt for Autonomous Cars to Save on Insurance, Study Finds: Published: Nov. 7, 2013, downloaded from www.edmunds.com/car-news/drivers-would-opt-for-autonomous-cars-to-save-on-insurance-study-finds.html on Jan. 2, 2014, 6 pages.

Neumann, Peter G. and Contributors, "Risks to the Public," ACM SIGSOFT Software Engineering Notes, Jul. 2012 vol. 37 No. 4, pp. 20-29.

Kirkpatrick, Keith, "Legal issues with Robots," Communications of the ACM, Nov. 2013, vol. 56 No. 11, pp. 17-19.

Ingolfo, Silvia, and Silva Souza, Vitor E., "Law and Adaptivity in Requirements Engineering," SEAMS 2013, pp. 163-168.

O'Donnell, Anthony, "Prepare for Deep Auto Insurance Premium Drop Scenario, Celent Report Advises," Insurance & Technology, May 8, 2012, downloaded from http://www.insurancetech.com/claims/prepare-for-deep-auto-insurance-premium/232901645?printer_friendly=this-p., Jan. 9, 2014, 3 pages.

Top issues: An annual report "The insurance industry in 2013; Strategy: Reshaping auto insurance", vol. 5, 2013, 6 pages.

O'Donnell, Anthony, "Rapid Emergence of Driverless Cars Demands Creation of Legal Infrastructure, Stanford Scholar Says," Insurance & Technology—Online, Jan. 3, 2013, downloaded from http: I I search.proquest.com.ezproxy.apollolibrary.com/ docview / 12 66 314 720 /fulltext/ 142 DA8916CC2 E861A14/ 11 ?accountid = 3 5812, Jan. 8, 2014, 2 pages.

"Self-driving cars: The next revolution" (kpmg.com | cargroup.org), 2012, 36 pages.

The autonomous car: The road to driverless driving, May 30, 2013, downloaded from analysis.telematicsupdate.com/v2x-safety/autonomous-car-road-driverless-driving on Jan. 2, 2014, 6 pages.

Ruquet, Mark E., "Who Insures a Driverless Car"? Property & Casualty 360, Oct. 1, 2012, downloaded from http:/ / search.proquest.com on Jan. 8, 2014, 2 pages.

Neil, Dan, "Who's Behind the Wheel? Nobody. The driverless car is coming. And we all should be glad it is," Wall Street Journal (Online) [New York, N.Y] Sep. 24, 2012, downloaded from http:/ /search.proquest.com on Jan. 8, 2014, 4 pages.

Bylund, Anders, "Would You Buy a Self-Driving Car to Save 80% on Auto Insurance?" The Motley Fool, Nov. 27, 2013, http://www.dailyfinance.com/2013/11/27/would-you-buy-a-self-driving-car-to-save-80-on-car/, 2 pages.

Litman, Todd, "Autonomous Vehicle Implementation Predictions Implications for Transport Planning," Victoria Transport Policy Institute, Dec. 23, 2013, 19 pages.

VentureBeat.com webpage; "Cisco and NXP encourage car communication to make driving safer" www.venturebeat.com/2013/01/04/cisco-and-nxp-encourage-car-communication-to-make-driving-safer, Rebecca Grant dated Jan. 4, 2013.

Zalstein, David, Car Advice. com webpage, "First large-scale vehicle-to-vehicle communication technology test unveiled" dated Aug. 22, 2012, www.caradvice.com.au/187379/first-large-scale-vehicle-to-vehicle-communication-technology-test-unveiled/basic-rgb-4/, 3 pages.

EE Herald webpage, "DSRC Packet Sniffer, a vehicle-to-vehicle communication technology is under demo"; www.eeherald.com/section/news/nw10000198.html; dated Nov. 22, 2008.

Kotani, Kazuya et al., "Inter-Vehicle Communication Protocol for Cooperatively Capturing and Sharing" Intersection Video; date unkown but believed to be before 2011.

Oki Webpage "OKI Develops World's First DSRC Inter-vehicle Communication Attachment for Mobile Phones to Help Pedestrian Safety" dated Jan. 8, 2009.

Zeng, X., Yin, K., and Ge, H., "Hazardous Driving Prediction System," Submission to the Connected Vehicle Technology Challenge,Sep. 24, 2014, 20 pages.

* cited by examiner

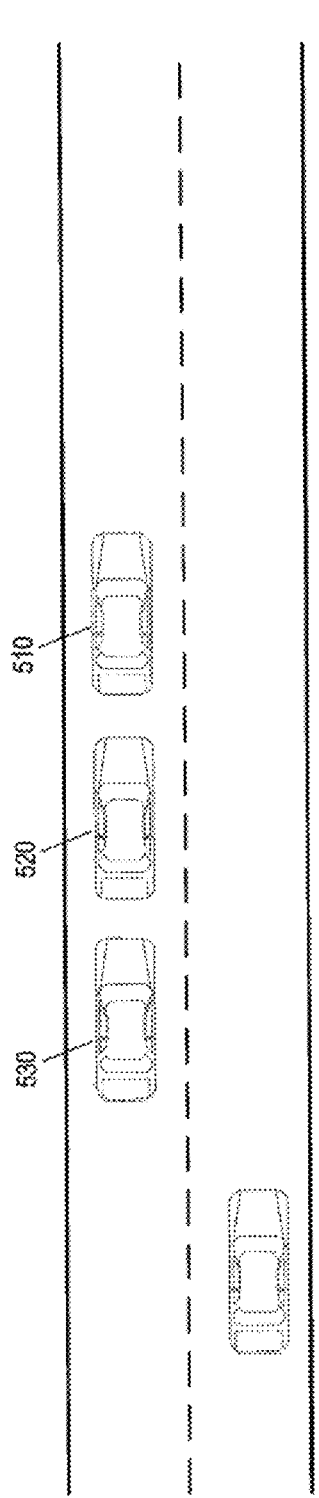
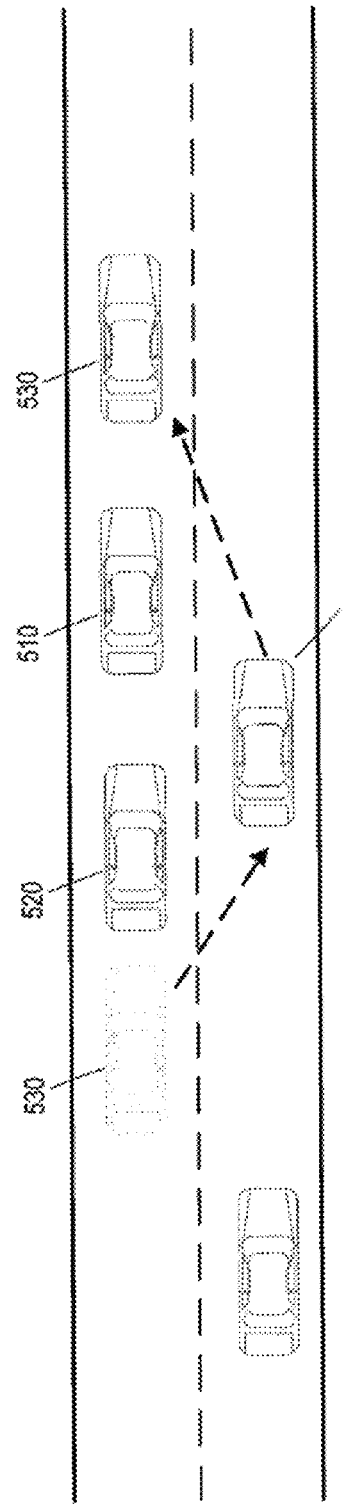

REWARD SYSTEM RELATED TO A VEHICLE-TO-VEHICLE COMMUNICATION SYSTEM

TECHNICAL FIELD

Aspects of the disclosure generally relate to the analysis of vehicle driving data, including vehicle driving data from vehicles involved in aspects of autonomous driving. In particular, various aspects of the disclosure relate to receiving and transmitting driving data, included data related to autonomous driving relationships between vehicles, analyzing driving data, and determining ruminative rewards and/or aspects of vehicle insurance procurement.

BACKGROUND

Many vehicles include sensors and internal computer systems designed to monitor and control vehicle operations, driving conditions, and driving functions. Advanced vehicles systems can perform such tasks as monitoring fuel consumption and optimizing engine operation to achieve higher fuel efficiency, detecting and correcting a loss of traction on an icy road, and detecting a collision and automatically contacting emergency services. Various vehicle-based communication systems allow vehicles to communicate with other devices inside or outside of the vehicle. For example, a Bluetooth system may enable communication between the vehicle and the driver's mobile phone. Telematics systems may be configured to access vehicle computers and sensor data, including on-board diagnostics systems (OBD), and transmit the data to a display within the vehicle, a personal computer or mobile device, or to a centralized data processing system. Data obtained from vehicle sensors and OBD systems has been used for a variety of purposes, including maintenance, diagnosis, and analysis. Additionally, vehicle-to-vehicle (V2V) communication systems can be used to provide drivers with safety warnings and collision alerts based on data received from other nearby vehicles. Additionally, vehicles can include autonomous driving systems that assume all or part of real-time driving functions to operate the vehicle without real-time input from a human operator.

When out on the road, vehicles and drivers may engage in many different types of driving behaviors, including various "social interactions" with other vehicles and drivers. An example social interaction can include vehicle drafting where one vehicle follows another vehicle to reduce the overall effect of drag and improve fuel efficiency. Another example social interaction can include autonomous vehicle droning where a vehicle engages in at least partial autonomous driving based on the driving of a lead or pilot vehicle.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods and computer devices for receiving and transmitting driving data, analyzing driving data, and determining whether a first vehicle is engaged in a drafting relationship with at least a second vehicle and allocating a drafting reward based on the drafting relationship. A drafting characteristic of the drafting relationship can be determined using vehicle operational data. Example drafting characteristics can include a vehicle spacing, vehicle speed, and/or vehicle type. A drafting property associated with the first or second vehicle can be determined using the drafting characteristic. Example drafting properties can include a drafting fuel savings rate, a drafting savings amount, and/or a percentage increase in miles-per-gallon. Example drafting rewards can include a cash payment, a carbon credit, a fuel credit, a tax credit, a rebate, and at least a portion of a drafting fuel savings amount associated with the first vehicle driving analysis computer.

In accordance with further aspects of the present disclosure, a property of an insurance policy may be determined by receiving and analyzing driving data from vehicles engaged in an autonomous droning relationship where a vehicle engages in at least partial autonomous driving based on information from another vehicle. A characteristic of the autonomous droning relationship can be determined from, for example, the received driving data. Example characteristics of an autonomous droning relationship include identification of a lead vehicle and a drone vehicle, an amount of time a vehicle is the lead or drone vehicle, and the amount of driving distance a vehicle is the lead or drone vehicle. Example properties of an insurance policy can include a premium for the first insurance policy, a deductible of the first insurance policy, and a coverage amount of the first insurance policy. Aspects of the disclosure also include determining an autonomous droning insurance factor using vehicle operational data and/or a characteristic of the autonomous droning relationship. The autonomous droning insurance factor can be used to determine the property of the first insurance policy using the autonomous droning insurance factor.

Aspects of the present disclosure provide incentives for beneficial social interactions between vehicles and drivers. Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIGS. 6A-6B are diagrams illustrating examples of various driving interactions that may be analyzed according to one or more aspects of the disclosure.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. In addition, aspects may take the form of a computing device configured to perform specified actions. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
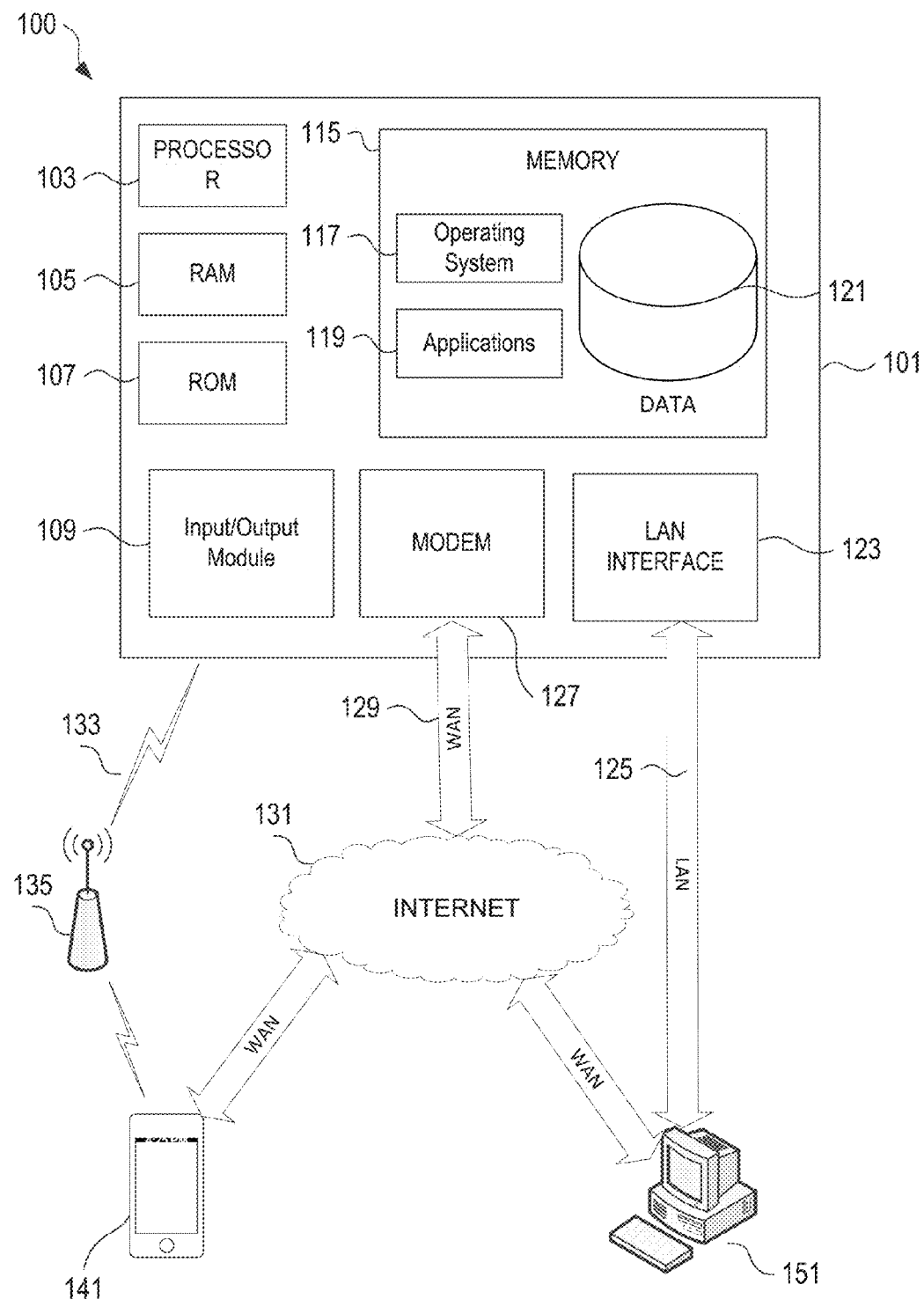
FIG. 1 illustrates a network environment and computing systems that may be used to implement aspects of the disclosure.

FIG. 1 illustrates a block diagram of a computing device 101 in driving analysis communication system 100 that may be used according to one or more illustrative embodiments of the disclosure. The driving analysis device 101 may have a processor 103 for controlling overall operation of the device 101 and its associated components, including RAM 105, ROM 107, input/output module 109, and memory unit 115. The computing device 101, along with one or more additional devices (e.g., terminals 141, 151) may correspond to any of multiple systems or devices, such as a driving analysis computing devices or systems, configured as described herein for transmitting and receiving vehicle operational data, analyzing vehicle operational data, and determining driving characteristics and various properties related to driver rewards and/or vehicle insurance based on the data. Vehicle operational data can include data collected from vehicle sensors and OBD systems. Vehicle operations can also include data pertaining to the driver of a vehicle. Vehicle operational data can also include data pertaining to other nearby vehicles collected via, for example, V2V communications. As used herein, vehicle operation data is used interchangeably with driving data.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory unit 115 and/or other storage to provide instructions to processor 103 for enabling device 101 to perform various functions. For example, memory unit 115 may store software used by the device 101, such as an operating system 117, application programs 119, and an associated internal database 121. The memory unit 115 includes one or more of volatile and/or non-volatile computer memory to store computer-executable instructions, data, and/or other information. Processor 103 and its associated components may allow the driving analysis system 101 to execute a series of computer-readable instructions to transmit or receive vehicle driving data, analyze driving data, determine driving characteristics from the driving data, and determine properties of, for example, driver rewards or insurance policies based on the driving data.

The driving analysis computing device 101 may operate in a networked environment 100 supporting connections to one or more remote computers, such as terminals/devices 141 and 151. Driving analysis computing device 101, and related terminals/devices 141 and 151, may include devices installed in vehicles, mobile devices that may travel within vehicles, or devices outside of vehicles that are configured to receive and process vehicle and driving data. Thus, the driving analysis computing device 101 and terminals/devices 141 and 151 may each include personal computers (e.g., laptop, desktop, or tablet computers), servers (e.g., web servers, database servers), vehicle-based devices (e.g., on-board vehicle computers, short-range vehicle communication systems, telematics devices), or mobile communication devices (e.g., mobile phones, portable computing devices, and the like), and may include some or all of the elements described above with respect to the driving analysis computing device 101. The network connections depicted in FIG. 1 include a local area network (LAN) 125 and a wide area network (WAN) 129, and a wireless telecommunications network 133, but may also include other networks. When used in a LAN networking environment, the driving analysis computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 141 (e.g., mobile phones, short-range vehicle communication systems, vehicle telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and driving analysis system components described herein may be configured to communicate using any of these network protocols or technologies.

Additionally, one or more application programs 119 used by the driving analysis computing device 101 may include computer executable instructions (e.g., driving data analysis programs, driving characteristic algorithms, driving and insurance policy properties algorithms, and driver reward algorithms) for transmitting and receiving vehicle driving data, determining driving characteristics, and determining various properties associated with one or more vehicles or drivers, and performing other related functions as described herein.

Figure 2:
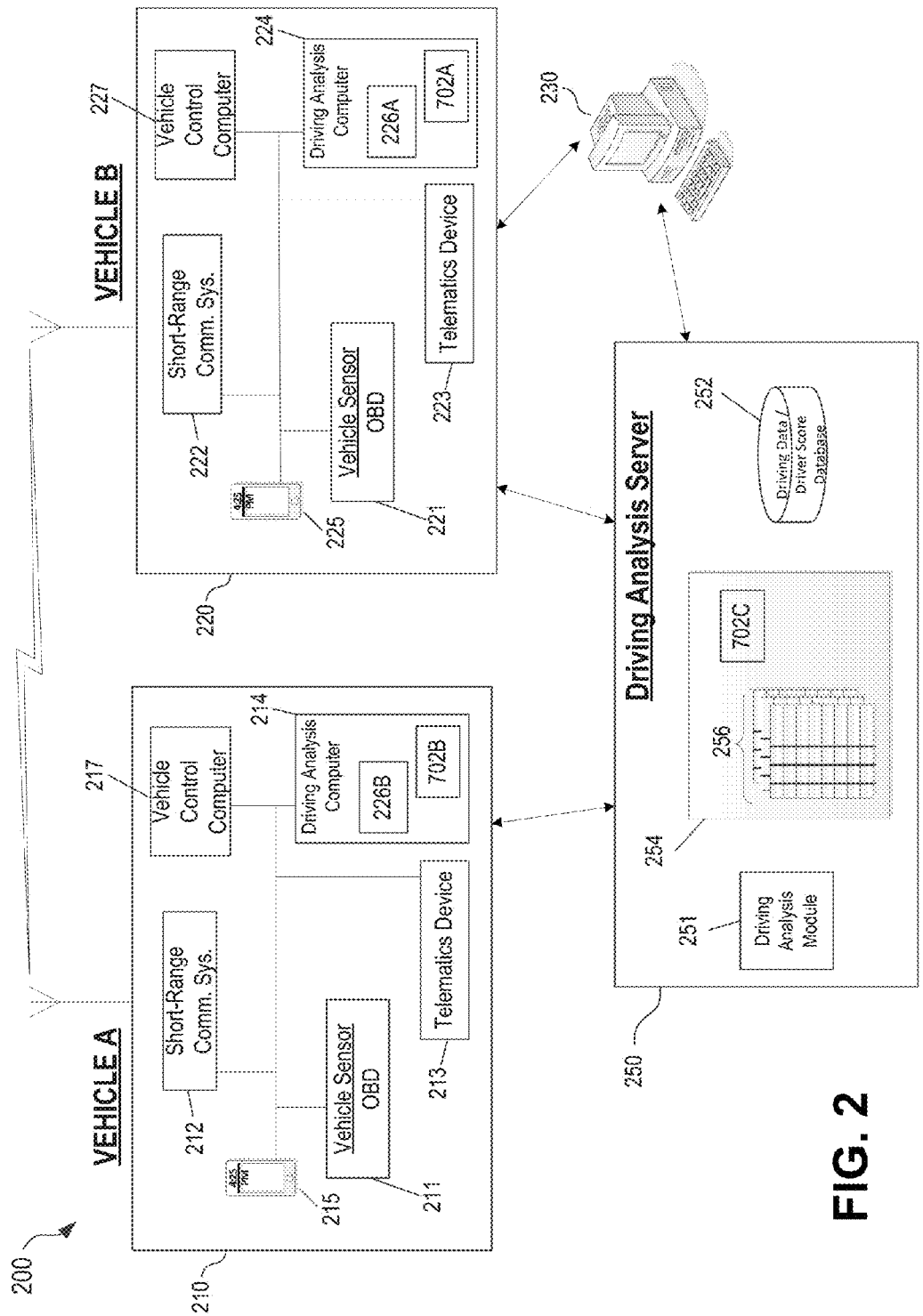
FIG. 2 is a diagram illustrating various example components of a driving analysis computing device according to one or more aspects of the disclosure.

As used herein, a driving characteristic may refer to one or more actions or events performed by a vehicle and can include aspects of information identified or determined from vehicle operational data collected from a vehicle. A driving characteristic can include, for example, a vehicle speed and/or gas mileage identified from the vehicle operational data. In addition, for example, a driving characteristic may include a vehicle speed or a gas mileage determined from other operational data collected from the vehicle. As discussed below, a driving characteristic may be determined from driving data collected by a vehicle sensors and telematics device, and/or additional data received from other nearby vehicles using vehicle-to-vehicle (V2V) communications. It should be understood that a driving characteristic may be associated with a vehicle, a driver, or a group of vehicles or drivers engaged in social interaction, such as an autonomous droning relationship FIG. 2 is a diagram of an illustrative driving analysis system 200 including two vehicles 210 and 220, a driving analysis server 250, and additional related components. Each component shown in FIG. 2 may be implemented in hardware, software, or a combination of the two. Additionally, each component of the driving analysis system 200 may include a computing device (or system) having some or all of the structural components described above for computing device 101.

Vehicles 210 and 220 in the driving analysis system 200 may be, for example, automobiles, motorcycles, scooters, buses, recreational vehicles, boats, or other vehicles for which a vehicle driving data may be collected and analyzed. The vehicles 210 and 220 each include vehicle operation sensors 211 and 221 capable of detecting and recording various conditions at the vehicle and operational parameters of the vehicle. For example, sensors 211 and 221 may detect and store data corresponding to the vehicle's location (e.g., GPS coordinates), speed and direction, rates of acceleration or braking, gas mileage, and specific instances of sudden acceleration, braking, and swerving. Sensors 211 and 221 also may detect and store data received from the vehicle's 210 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems, including the vehicle OBD.

Additional sensors 211 and 221 may detect and store the external driving conditions, for example, external temperature, rain, snow, light levels, and sun position for driver visibility. For example, external cameras and proximity sensors 211 and 221 may detect other nearby vehicles, vehicle spacing, traffic levels, road conditions, traffic obstructions, animals, cyclists, pedestrians, and other conditions that may factor into a driving event data analysis. Sensors 211 and 221 also may detect and store data relating to moving violations and the observance of traffic signals and signs by the vehicles 210 and 220. Additional sensors 211 and 221 may detect and store data relating to the maintenance of the vehicles 210 and 220, such as the engine status, oil level, engine coolant temperature, odometer reading, the level of fuel in the fuel tank, engine revolutions per minute (RPMs), and/or tire pressure.

Vehicles sensors 211 and 221 also may include cameras and/or proximity sensors capable of recording additional conditions inside or outside of the vehicles 210 and 220. For example, internal cameras may detect conditions such as the number of the passengers and the types of passengers (e.g. adults, children, teenagers, pets, etc.) in the vehicles, and potential sources of driver distraction within the vehicle (e.g., pets, phone usage, unsecured objects in the vehicle). Sensors 211 and 221 also may be configured to collect data a driver's movements or the condition of a driver. For example, vehicles 210 and 220 may include sensors that monitor a driver's movements, such as the driver's eye position and/or head position, etc. Additional sensors 211 and 221 may collect data regarding the physical or mental state of the driver, such as fatigue or intoxication. The condition of the driver may be determined through the movements of the driver or through other sensors, for example, sensors that detect the content of alcohol in the air or blood alcohol content of the driver, such as a breathalyzer.

Certain vehicle sensors 211 and 221 also may collect information regarding the driver's route choice, whether the driver follows a given route, and to classify the type of trip (e.g. commute, errand, new route, etc.). In certain embodiments, sensors and/or cameras 211 and 221 may determine when and how often the vehicles 210 and 220 stay in a single lane or stray into other lanes. A Global Positioning System (GPS), locational sensors positioned inside the vehicles 210 and 220, and/or locational sensors or devices external to the vehicles 210 and 220 may be used determine the route, lane position, and other vehicle position/location data.

The data collected by vehicle sensors 211 and 221 may be stored and/or analyzed within the respective vehicles 210 and 220, such as for example a driving analysis computer 217, 227 integrated into the vehicle, and/or may be transmitted to one or more external devices. For example, as shown in FIG. 2, sensor data may be transmitted via short-range communication systems 212 and 222 to other nearby vehicles. Additionally, the sensor data may be transmitted via telematics devices 213 and 223 to one or more remote computing devices, such as driving analysis server 250.

Short-range communication systems 212 and 222 are vehicle-based data transmission systems configured to transmit vehicle operational data to other nearby vehicles, and to receive vehicle operational data from other nearby vehicles. In some examples, communication systems 212 and 222 may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication systems 212 and 222 need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. The vehicle-to-vehicle (V2V) transmissions between the short-range communication systems 212 and 222 may be sent via DSRC, Bluetooth, satellite, GSM infrared, IEEE 802.11, WiMAX, RFID, and/or any suitable wireless communication media, standards, and protocols. In certain systems, short-range communication systems 212 and 222 may include specialized hardware installed in vehicles 210 and 220 (e.g., transceivers, antennas, etc.), while in other examples the communication systems 212 and 222 may be implemented using existing vehicle hardware components (e.g., radio and satellite equipment, navigation computers) or may be implemented by software running on the mobile devices 215 and 225 of drivers and passengers within the vehicles 210 and 220.

The range of V2V communications between vehicle communication systems 212 and 222 may depend on the wireless communication standards and protocols used, the transmission/reception hardware (e.g., transceivers, power sources, antennas), and other factors. Short-range V2V communications may range from just a few feet to many miles, and different types of driving behaviors may be determined depending on the range of the V2V communications. For example, V2V communications ranging only a few feet may be sufficient for a driving analysis computing device 101 in one vehicle to determine that another vehicle is tailgating or cut-off the vehicle, whereas longer communications may allow the device 101 to determine additional types of driving behaviors (e.g., vehicle spacing, yielding, defensive avoidance, proper response to a safety hazard, etc.).

V2V communications also may include vehicle-to-infrastructure (V2I) communications, such as transmissions from vehicles to non-vehicle receiving devices, for example, toll booths, rail road crossings, and road-side traffic monitoring devices. Certain V2V communication systems may periodically broadcast data from a vehicle 210 to any other vehicle, or other infrastructure device capable of receiving the communication, within the range of the vehicle's transmission capabilities. For example, a vehicle 210 may periodically broadcast (e.g., every 0.1 second, every 0.5 seconds, every second, every 5 seconds, etc.) certain vehicle operation data via its short-range communication system 212, regardless of whether or not any other vehicles or reception devices are in range. In other examples, a vehicle communication system 212 may first detect nearby vehicles and receiving devices, and may initialize communication with each by performing a handshaking transaction before beginning to transmit its vehicle operation data to the other vehicles and/or devices.

The types of vehicle operational data, or vehicle driving data, transmitted by vehicles 210 and 220 may depend on the protocols and standards used for the V2V communication, the range of communications, the autonomous driving system, and other factors. In certain examples, vehicles 210 and 220 may periodically broadcast corresponding sets of similar vehicle driving data, such as the location (which may include an absolute location in GPS coordinates or other coordinate systems, and/or a relative location with respect to another vehicle or a fixed point), speed, and direction of travel. In certain examples, the nodes in a V2V communication system (e.g., vehicles and other reception devices) may use internal clocks with synchronized time signals, and may send transmission times within V2V communications, so that the receiver may calculate its distance from the transmitting node based on the difference between the transmission time and the reception time. The state or usage of the vehicle's 210 controls and instruments may also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, etc.). Vehicle warnings such as a detection by the vehicle's 210 internal systems that the vehicle is skidding, that an impact has occurred, or that the vehicle's airbags have been deployed, also may be transmitted in V2V communications. In various other examples, any data collected by any vehicle sensors 211 and 221 potentially may be transmitted via V2V communication to other nearby vehicles or infrastructure devices receiving V2V communications from communication systems 212 and 222. Further, additional vehicle driving data not from the vehicle's sensors (e.g., vehicle make/model/year information, driver insurance information, driving route information, vehicle maintenance information, driver scores, etc.) may be collected from other data sources, such as a driver's or passenger's mobile device 215 or 225, driving analysis server 250, and/or another external computer system 230, and transmitted using V2V communications to nearby vehicles and other receiving devices using communication systems 212 and 222.

As shown in FIG. 2, the data collected by vehicle sensors 211 and 221 also may be transmitted to a driving analysis server 250, and one or more additional external servers and devices via telematics devices 213 and 223. Telematics devices 213 and 223 may be computing devices containing many or all of the hardware/software components as the computing device 101 depicted in FIG. 1. As discussed above, the telematics devices 213 and 223 may receive vehicle operation data and driving data from vehicle sensors 211 and 221, and may transmit the data to one or more external computer systems (e.g., driving analysis server 250 of an insurance company, financial institution, or other entity) over a wireless transmission network. Telematics devices 213 and 223 also may be configured to detect or determine additional types of data relating to real-time driving and the condition of the vehicles 210 and 220. In certain embodiments, the telematics devices 213 and 223 may contain or may be integral with one or more of the vehicle sensors 211 and 221. The telematics devices 213 and 223 also may store the type of their respective vehicles 210 and 220, for example, the make, model, trim (or sub-model), year, and/or engine specifications, as well as other information such as vehicle owner or driver information, insurance information, and financing information for the vehicles 210 and 220.

In the example shown in FIG. 2, telematics devices 213 and 223 may receive vehicle driving data from vehicle sensors 211 and 221, and may transmit the data to a driving analysis server 250. However, in other examples, one or more of the vehicle sensors 211 and 221 may be configured to transmit data directly to a driving analysis server 250 without using a telematics device. For instance, telematics devices 213 and 223 may be configured to receive and transmit data from certain vehicle sensors 211 and 221, while other sensors may be configured to directly transmit data to a driving analysis server 250 without using the telematics device 216. Thus, telematics devices 213 and 223 may be optional in certain embodiments.

In certain embodiments, vehicle sensors, vehicle OBD, and/or vehicle communication systems, may collect and/or transmit data pertaining to autonomous driving of the vehicles. In autonomous driving, the vehicle fulfills all or part of the driving without being piloted by a human. An autonomous car can be also referred to as a driverless car, self-driving car, or robot car. For example, in autonomous driving, a vehicle control computer 217, 227 may be configured to operate all or some aspects of the vehicle driving, including but not limited to acceleration, deceleration, steering, and/or route navigation. A vehicle with an autonomous driving capability may sense its surroundings using the vehicle sensors 221, 221 and/or receive inputs regarding control of the vehicle from the vehicle communications systems, including but not limited to short range communication systems 212, Telematics 213, or other vehicle communication system.

In certain embodiments, vehicle operational data can be collected from vehicles engaged in an autonomous droning relationship. As used herein, vehicles engaged in an autonomous droning relationship include where a vehicle engages in at least partial autonomous driving based on following the driving of a lead or pilot vehicle. In other words, in autonomous droning, the driving of the "drone" car is automated based at least in part on the driving of a lead vehicle. The lead vehicle can be a vehicle which the drone is following. For example, referring to FIGS. 6A and 6B, the driving of vehicle 520 may be automated based on the driving of vehicle 510. In such example, vehicle 510 can be referred to as the lead or pilot vehicle. For example, the acceleration, deceleration, braking, steering, and other operations of the drone vehicle 520 can be synchronized with that of the lead vehicle 510. Also, as shown by example in FIG. 6A, autonomous droning can be used to form caravans or platoons of one or more vehicles 530, 520 following the driving of the lead vehicle 510 and/or a vehicle which the drone is following. The drivers of the drone vehicle can, for example, pay attention to matters other than driving when the vehicle is engaged in an autonomous droning relationship. The lead vehicle can be driven manually, autonomously, or partially autonomously. Vehicles can engage in an autonomous droning relationship using systems of the vehicle alone or in cooperation with systems of other vehicles. For example, a drone vehicle may rely on vehicle sensors 211 and the vehicle control computer 217 to automate driving based on a lead vehicle it is following. In addition, a drone vehicle may use information received from vehicle communication systems, including V2V systems, of the lead vehicle to automate its driving. In addition, a drone vehicle may use both vehicle sensors 211 and information from other vehicles, including a lead vehicle, to automate its driving. Vehicle operational data collected from vehicles engaged in an autonomous droning relationship can include all types of information and data described herein.

In certain embodiments, mobile computing devices 215 and 225 within the vehicles 210 and 220 may be used to collect vehicle driving data and/or to receive vehicle driving data from sensors 211 and 221, and then to transmit the vehicle driving data to the driving analysis server 250 and other external computing devices. Mobile computing devices 215 and 225 may be, for example, mobile phones, personal digital assistants (PDAs), or tablet computers of the drivers or passengers of vehicles 210 and 220. Software applications executing on mobile devices 215 and 225 may be configured to detect certain driving data independently and/or may communicate with vehicle sensors 211 and 221 to receive additional driving data. For example, mobile devices 215 and 225 equipped with GPS functionality may determine vehicle location, speed, direction and other basic driving data without needing to communicate with the vehicle sensors 211 or 221, or any vehicle system. In other examples, software on the mobile devices 215 and 225 may be configured to receive some or all of the driving data collected by vehicle sensors 211 and 221. Mobile computing devices 215 and 225 may also be involved with aspects of autonomous driving, including receiving, collecting, and transmitting vehicle operational data regarding autonomous driving and autonomous driving relationship between multiple vehicles.

When mobile computing devices 215 and 225 within the vehicles 210 and 220 are used to detect vehicle driving data and/or to receive vehicle driving data from vehicles 211 and 221, the mobile computing devices 215 and 225 may store, analyze, and/or transmit the vehicle driving data to one or more other devices. For example, mobile computing devices 215 and 225 may transmit vehicle driving data directly to one or more driving analysis servers 250, and thus may be used in conjunction with or instead of telematics devices 213 and 223. Additionally, mobile computing devices 215 and 225 may be configured to perform the V2V communications described above, by establishing connections and transmitting/receiving vehicle driving data to and from other nearby vehicles. Thus, mobile computing devices 215 and 225 may be used in conjunction with or instead of short-range communication systems 212 and 222 in some examples. In addition, mobile computing devices 215 and 225 may be used in conjunction with the vehicle control computers 217 and 227 for purposes of autonomous driving. Moreover, the processing components of the mobile computing devices 215 and 225 may be used to analyze vehicle driving data, determine driving characteristics, determine properties related to rewards and/or aspects of vehicle insurance, and perform other related functions. Therefore, in certain embodiments, mobile computing devices 215 and 225 may be used in conjunction with, or in place of, the driving analysis computers 214 and 224.

Vehicles 210 and 220 may include driving analysis computers 214 and 224, which may be separate computing devices or may be integrated into one or more other components within the vehicles 210 and 220, such as the short-range communication systems 212 and 222, telematics devices 213 and 223, or the internal computing systems of vehicles 210 and 220. As discussed above, driving analysis computers 214 and 224 also may be implemented by computing devices independent from the vehicles 210 and 220, such as mobile computing devices 215 and 225 of the drivers or passengers, or one or more separate computer systems 230 (e.g., a user's home or office computer). In any of these examples, the driving analysis computers 214 and 224 may contain some or all of the hardware/software components as the computing device 101 depicted in FIG. 1. Further, in certain implementations, the functionality of the driving analysis computers, such as storing and analyzing vehicle driving data, determining driving characteristics, and determining rewards and/or aspects of insurance policies, may be performed in a central driving analysis server 250 rather than by individual vehicles 210 and 220. In such implementations, the vehicles 210 and 220 might only collect and transmit vehicle driving data to a driving analysis server 250, and thus the vehicle-based driving analysis computers 214 and 224 may be optional.

Driving analysis computers 214 and 224 may be implemented in hardware and/or software configured to receive vehicle driving data from vehicle sensors 211 and 221, short-range communication systems 212 and 222, telematics devices 213 and 223, vehicle control computer 217 and 227 and/or other driving data sources. Vehicle sensors/OBDs 211 and 221, short-range communication systems 212 and 222, telematics devices 213 and 223, vehicle control computer 217 and 227 and/or other driving data sources can be referred to herein individually or collectively as a vehicle data acquiring component. The driving analysis computer 214, 224 may comprise an electronic receiver to interface with the vehicle data acquiring components to receive the collected data. After receiving, via the electronic receiver, the vehicle driving data from, for example a vehicle data acquiring component, the driving analysis computers 214 and 224 may perform a set of functions to analyze the driving data, determine driving characteristics, and determine properties related to driver rewards and/or vehicle insurance. For example, the driving analysis computers 214 and 224 may include one or more driving characteristic algorithms, which may be executed by software running on generic or specialized hardware within the driving analysis computers. The driving analysis computer 214 in a first vehicle 210 may use the vehicle driving data received from that vehicle's sensors 211, along with vehicle driving data for other nearby vehicles received via the short-range communication system 212, to determine driving characteristics and determine properties related to rewards and/or vehicle insurance applicable to the first vehicle 210 and the other nearby vehicles. Within the driving analysis computer 214, a vehicle insurance property reward function may use the results of the driving analysis performed by the computer 214 to determine/adjust a property of an insurance policy for a driver of a vehicle 210 or other vehicles based on determined driving characteristics. Further descriptions and examples of the algorithms, functions, and analyses that may be executed by the driving analysis computers 214 and 224 are described below in reference to FIGS. 3 and 4.

The system 200 also may include a driving analysis server 250, containing some or all of the hardware/software components as the computing device 101 depicted in FIG. 1. The driving analysis server 250 may include hardware, software, and network components to receive vehicle operational data/driving data from one or more vehicles 210 and 220, and other data sources. The driving analysis server 250 may include a driving data and driver data database 252 and driving analysis computer 251 to respectively store and analyze driving data received from vehicles and other data sources. The driving analysis server 250 may initiate communication with and/or retrieve driving data from vehicles 210 and 220 wirelessly via telematics devices 213 and 223, mobile devices 215 and 225, or by way of separate computing systems (e.g., computer 230) over one or more computer networks (e.g., the Internet). Additionally, the driving analysis server 250 may receive additional data relevant to driving characteristic or other determinations from other non-vehicle data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.), and insurance company databases containing insurance data (e.g., driver score, coverage amount, deductible amount, premium amount, insured status) for the vehicle, driver, and/or other nearby vehicles and drivers.

Data stored in the driving data database 252 may be organized in any of several different manners. For example, a table in database 252 may contain all of the vehicle operation data for a specific vehicle 210, similar to a vehicle event log. Other tables in the database 252 may store certain types of data for multiple vehicles. For instance, tables may store specific data sets, including correlations related to the vehicle for use in determining driving characteristics and/or properties related to driver rewards and/or vehicle insurance.

The driving analysis computer 251 within the driving analysis server 250 may be configured to retrieve data from the driving data and driver score database 252, or may receive driving data directly from vehicles 210 and 220 or other data sources, and may perform driving data analyses, driving characteristic determinations, driver reward and/or vehicle insurance determinations, and other related functions. The functions performed by the driving analysis computer 251 may be similar to those of driving analysis computers 214 and 224, and further descriptions and examples of the algorithms, functions, and analyses that may be executed by the driving analysis computer 251 are described below in reference to FIGS. 3 and 4.

In various examples, the driving data analyses, driving characteristic determinations, and driving reward and/or insurance property determinations may be performed entirely in the driving analysis computer 251 of the driving analysis server 250 (in which case driving analysis computers 214 and 224 need not be implemented in vehicles 210 and 220), or may be performed entirely in the vehicle-based driving analysis computers 214 and 224 (in which case the driving analysis computer 251 and/or the driving analysis server 250 need not be implemented). In other examples, certain driving data analyses may be performed by vehicle-based driving analysis computers 214 and 224, while other driving data analyses are performed by the driving analysis computer 251 at the driving analysis server 250. For example, a vehicle-based driving analysis computer 214 may continuously receive and analyze driving data from nearby vehicles to determine certain driving characteristics (e.g., aspects related to vehicle drafting, aspects related to autonomous driving, etc.) so that large amounts of driving data need not be transmitted to the driving analysis server 250. However, for example, after driving characteristic is determined by the vehicle-based driving analysis computer 214, the characteristic may be transmitted to the server 250, and the driving analysis computer 251 may determine if a driver reward and insurance vehicle property should be updated based on the determined driving characteristic.

Figure 3:
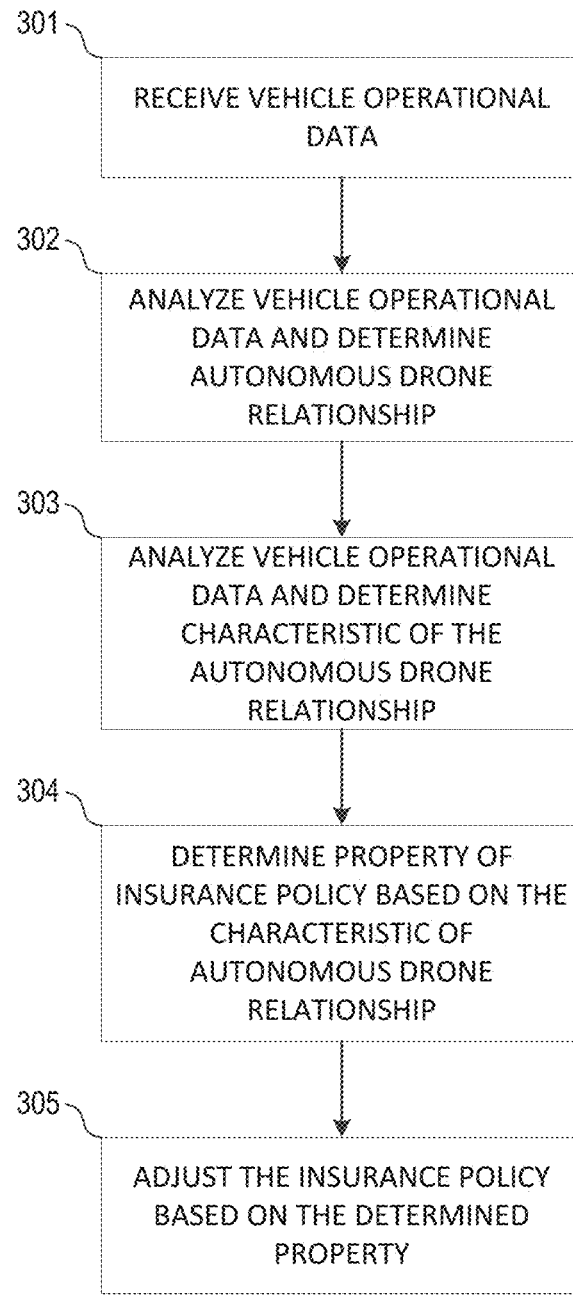
FIG. 3 is a flow diagram illustrating an example method of analyzing vehicle driving data, including determining whether vehicles are engaged in a drafting relationship, determining a drafting property associated with a vehicle in a drafting relationship, and allocating a drafting reward based on the drafting property.

FIG. 3 is a flow diagram illustrating an example method of determining a property of an insurance policy based on analysis of vehicle operational data of vehicles engaged in an autonomous droning relationship. This example method may be performed by one or more computing devices in a driving analysis system, such as vehicle-based driving analysis computers 214 and 224, a driving analysis computer 251 of a driving analysis server 250, user mobile computing devices 215 and 225, and/or other computer systems.

The steps shown in FIG. 3 describe performing an analysis of vehicle operational data to determine driving characteristics of vehicles engaged in an autonomous droning relationship and determining a property of an insurance policy based on the determined property. In step 301, vehicle operational data may be received from a first vehicle 210. As described above, a driving analysis computer 214 may receive and store vehicle driving data from a vehicle data acquiring component, including but not limited to the vehicle's internal computer systems and any combination of the vehicle's sensors 211 and/or communication systems. The data received in step 301 may include, for example, an identifier that the vehicle is engaged in autonomous driving and/or an autonomous driving relationship with another vehicle. The data received in step 301 may include, for example, the location, speed, and direction of the vehicle 210, object proximity data from the vehicle's external cameras and proximity sensors, and data from the vehicle's various systems used to determine if the vehicle 210 is braking, accelerated, or turning, etc., and to determine the status of the vehicle's user-operated controls (e.g., head lights, turn signals, hazard lights, radio, phone, etc.), along with any other data collected by vehicle sensors 211 or data received from a nearby vehicle.

In step 302, the vehicle operational data is analyzed to determine whether the vehicle is engaged in an autonomous droning relationship with another vehicle. For example, the driving data may include an identifier which indicates that the vehicle is engaged in an autonomous droning relationship. In addition, for example, a driving analysis computer 214 in a first vehicle 210 may compare the driving data (e.g., location, speed, direction) from its own vehicle sensors 211 (received in step 301) with the corresponding driving data (e.g., location, speed, direction) from a nearby vehicle 220. Based on the relative locations, speeds, and directions of travel of vehicles 210 and 220, the driving analysis computer 214 may determine that the vehicles are engaged in an autonomous driving relationship. In an embodiment, the driving data of the nearby vehicle can be collected by the data acquiring component of the first vehicle 210 via, for example, vehicle V2V. In an embodiment, the driving data of the nearby vehicle can be received from the nearby vehicle directly. In an embodiment, the driving data of the nearby vehicle can be determined from vehicle sensors 211 of the first vehicle.

In step 303, the vehicle driving data received in steps 301 may be analyzed, and driving characteristics of the autonomous droning relationship may be determined for the vehicles 210 and 220 based on the driving data. A driving characteristic of the autonomous droning relationship may include any number actions or events performed by the vehicles in the relationship or driving conditions or circumstances impacting the autonomous droning relationship. For example, a characteristic of an autonomous droning relationship can include identification of a lead vehicle, identification of the drone vehicle, an amount of time or distance a vehicle is the lead vehicle, an amount of time or distance a vehicle is a drone vehicle, that the lead vehicle is engaged in manual or autonomous driving, the number of vehicles engaged in the autonomous driving relationship, a weather condition, and/or a driver safety rating. The driving characteristic of the autonomous droning relationship can be determined by, for example, identifying the pertinent information from the received data, including actions or events performed by the vehicle or nearby vehicles. For example, the driving data may include a data point that identifies a vehicle as a lead vehicle in an autonomous driving relationship. In addition, for example the driving data may include time marked data from when a vehicle begins droning to when it completes droning. The driving characteristic can also be calculated using selected driving data. For example, if the driving data includes an identifier for when the vehicle is engaged in autonomous driving as a drone and time marked vehicle speed, the distance in which the vehicle is engaged in the autonomous driving relationship as a drone can be calculated. Example algorithms using time marked driving data are included in US Publications Number 2013/0073112 which is hereby incorporated by reference herein in its entirety. The driving characteristic can also be identified by comparing the driving data associated with a first vehicle with the corresponding driving data of a nearby vehicle. Based on information from, for example, the relative locations, speeds, and directions of travel of vehicles 210 and 220, the driving analysis computer 214 may determine a driving characteristic of the autonomous droning relationship involving the two vehicles.

In step 304, a property of an insurance policy may be determined using the characteristic of the autonomous droning relationship. The property of an insurance policy can include any of a number of aspects of a vehicle insurance policy. For example, a property of an insurance policy can include a premium, a deductible, a coverage term, a coverage amount, or other attribute of an insurance policy. In various embodiments, the property can be determined in accordance with rules set forth by the insurance provider. For example, the property of the vehicle insurance policy may change depending upon the characteristic of the autonomous droning relationship. For example, if the characteristic is that a first vehicle is a lead vehicle in an autonomous droning relationship, the deductible of an insurance policy of the first vehicle may increase in accordance with the number of vehicles engaged as drones. In addition, for example, a premium may decrease if the characteristic is that a first vehicle is engaged as a drone vehicle with a nearby vehicle which is piloted by a driver with a strong safety record and/or good driver safety rating.

In addition, in various embodiments, step 304 can include an additional step of determining an autonomous droning insurance factor using at least one of the vehicle operational data and the characteristic of the autonomous droning relationship and determine a property of an insurance policy using the autonomous droning insurance factor. As used herein, the autonomous droning insurance factor can include a variable used in an algorithm for calculating a property of an insurance policy. For example, an autonomous droning insurance factor can include a ratio of an amount of time a first vehicle is engaged in an autonomous droning relationship versus a total amount of time the first vehicle has driven over a period of time and/or a ratio of an amount of distance the first vehicle is engaged in an autonomous droning relationship versus a total distance the first vehicle has driven over a period of time. The factor can be used in an algorithm for calculating an insurance premium by, for example, assessing different rates for the periods of time or distance which the vehicle is engaged in autonomous driving.

In addition, in various embodiments, information pertaining to an insurance policy of a second vehicle can be used in determining the property of the first insurance policy of the first vehicle. For example, if the driving data includes a coverage amount of a vehicle engaged in the autonomous droning relationship and the coverage amount does not exceed a threshold level, the deductible of the first vehicle can increase.

In step 305, the driving analysis computer can adjust or cause to adjust the insurance policy based on the determined property. In various embodiments, the adjustment can occur during the coverage term and/or prior to the subsequent coverage term. In addition, the policy holder may be notified of the adjustment. Alternatively, the adjustment can come in the form of a reward to be received by the party to which it is allocated. For example, the system may cause the remunerative payment to be debited from a bank account associated the payor (e.g., a vehicle insurance company) and credited to the account of the policy holder of the insurance policy. As such, the paying party (e.g., the policy holder) may enjoy the benefit of the remunerative payment.

As shown in FIG. 3, a single vehicle-based driving analysis computer 214 may receive driving data for a first vehicle 210 (step 301), including driving data received from V2V communications including driving data for one or more other vehicles, may determine from the data whether the vehicle is engaged in an autonomous driving relationship (step 302), and may determine a characteristic of an autonomous droning relationship (step 303), determine a property of an insurance policy based on the characteristic (step 304), and adjust the insurance policy based on the determined property (step 305). However, other driving analysis computers and/or other computing devices may be used to some or all of the steps and functionality described above in reference to FIG. 3. For example, any of steps 301-305 may be performed by a user's mobile device 215 or 225 within the vehicles 210 or 220. These mobile devices 215 or 225, or another computing device 230, may execute software configured to perform similar functionality in place of the driving analysis computers 214 and 224. Additionally, some or all of the driving analysis functionality described in reference to FIG. 3 may be performed by a driving analysis computer 251 at a non-vehicle based driving analysis server 250. For example, vehicles 210 and 220 may be configured to transmit their own vehicle sensor data, and/or the V2V communications data received from other nearby vehicles, to a central driving analysis server 250 via telematics devices 213 and 223. In this example, the driving analysis computer 251 of the server 250 may perform the data analysis of steps 302 through 305.

Figure 5:
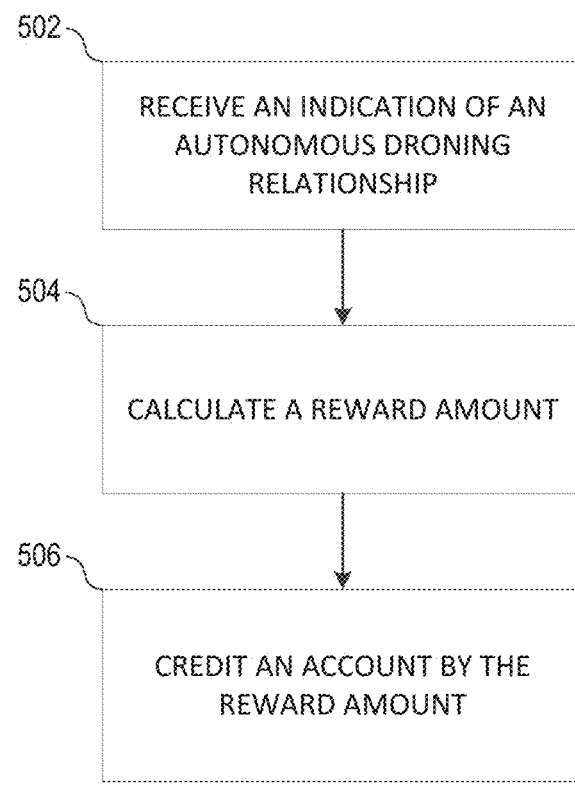
FIG. 5 is a flow diagram illustrating an example method used in an autonomous droning reward system.

FIG. 5 is a flow diagram of an illustrative method of awarding (e.g., crediting) one or more user accounts with a reward amount based on involvement in an autonomous droning relationship. The illustrative method steps may be performed by one or more computing devices in an autonomous droning reward system, including, but not limited to, a vehicle-based driving analysis computers 214 and 224, a driving analysis computer 251 of a driving analysis server 250, user mobile computing devices 215 and 225, and/or other computer systems.

Regarding step 502, an autonomous droning reward system may comprise an autonomous droning relationship determinator 226B configured to receive driving data indicating a lead vehicle 220 in an autonomous droning relationship with at least one following vehicle 210. The autonomous droning relationship determinator 226B may determine/identify when a vehicle is in an autonomous droning relationship. In some examples, a vehicle's data acquiring component may collect vehicle operation data and use some of that data to generate driving data. In other examples, vehicle operation data may be used interchangeably with driving data. In any event, the autonomous droning relationship determinator 226B may use the driving data to determine when one or more vehicles are in an autonomous droning relationship.

As explained above in accordance with various aspects of the disclosure, driving characteristic of an autonomous droning relationship can be determined by, for example, identifying pertinent information in the received data, including actions or events performed by vehicles 210, 220 or driving conditions or circumstances impacting the autonomous droning relationship. For example, the driving data may include an express data point/message/packet that identifies a vehicle (e.g., by its VIN number or other identifier) as a lead vehicle 220 in an autonomous driving relationship. In addition, the driving data may include a time-stamped message indicating that a following vehicle has started droning until when it completed droning. From such data, the distance traveled when in an autonomous droning relationship may be calculated. Similarly, the amount of time in the autonomous droning relationship may be calculated.

Furthermore, in some examples, vehicle driving data may be analyzed, and the driving characteristic of the autonomous droning relationship may be determined for the involved vehicles 210 and 220. For example, a characteristic of an autonomous droning relationship may include identification of a lead vehicle, identification of the drone vehicle, an amount of time or distance a vehicle is the lead vehicle, an amount of time or distance a vehicle is a drone vehicle, that the lead vehicle is engaged in manual or autonomous driving, the number of vehicles engaged in the autonomous droning relationship, a weather condition, a driver safety rating, and/or other characteristics. The driving characteristic can also be identified by comparing the driving data of a following vehicle 210 with driving data of a nearby vehicle 220. Based on information from, for example, the relative locations, speeds, and directions of travel of the vehicles 210, 220, autonomous droning relationship determinators 226A, 226B may determine that the two vehicles are in an autonomous droning relationship. Moreover, the autonomous droning relationship determinators 226A, 226B, in coordination with other computing devices 214, 224 at the vehicle, may determine the total number of vehicles engaged in the autonomous droning relationship. For example, three vehicles may be involved in an autonomous droning relationship, as illustrated in FIG. 6A.

While systems already exist for autonomous vehicles, such as the self-driving car by GOOGLE™, the spirit of this disclosure is not limited to just autonomous self-driving cars. For example, the lead vehicle 220 may be a completely autonomous vehicle, semi-autonomous vehicle, or a manual human-driven vehicle. Depending on the capabilities of the lead vehicle 220, the vehicle may be equipped with the appropriate sensors 221 and other electronic components to enable the automation/semi-automation, as is already known in the relevant art of autonomous/semi-autonomous vehicles. Similarly, a following (drone) vehicle 210 may be equipped with the appropriate hardware and software to operate as an autonomous vehicle, semi-autonomous vehicle, or a manually-driven vehicle. In contrast, however, in some examples, the following drone vehicle 210 may be equipped with less hardware and/or software than a lead vehicle 220 because to some extent, the following drone vehicle 210 may rely upon the lead vehicle 220 to provide guidance and commands for controlling the speed, acceleration, braking, cornering, route, and other operation of the following vehicle 210. For example, a following drone vehicle 210 may transmit data to the lead vehicle 220 using its short-range wireless communications system 212, and rely upon long-range wireless communication capabilities 222 of the lead vehicle to forward the data to the appropriate final destination. At least one benefit of such an arrangement is that the cost/price of a following drone vehicle 210 may be less than that of other vehicles (e.g., lead vehicle 220) due to reduced complexity and reduce hardware and/or software requirements.

In addition, the integrity of collected vehicle driving data may be validated by comparing, e.g., by a driving analysis computer, the driving data (e.g., location, speed, direction) from one vehicle's sensors 211 with corresponding driving data from a nearby vehicle 220. Based on the relative locations, speeds, and directions of travel of vehicles 210 and 220, an autonomous droning relationship determinator 226B of a driving analysis computer 214 may determine that the vehicles are engaged in an autonomous driving relationship. In one example, driving data of the nearby vehicle can be collected by a data acquiring component of a following/drone vehicle 210 via, for example, vehicle V2V. In one example, the driving data of the nearby vehicle may be directly received from the nearby vehicle.

In accordance with various aspects of the disclosure, in one example, an autonomous droning relationship determinator 226 may receive (in step 502) driving data indicating that a lead vehicle 220 is in an autonomous droning relationship with at least one following vehicle 210. The autonomous droning relationship determinator 226A may be executing in a driving analysis computer 224 at the lead vehicle 220. Alternatively, the autonomous droning relationship determinator 226B may be executing in a driving analysis computer 214 at one of the following/drone vehicles 210. In yet another alternative, the autonomous droning relationship determinator 226 may be distributed across the lead vehicle 220 and one or more following vehicles 210 such that the determination of whether a vehicle is involved in an autonomous droning relationship involves coordination/communication between more than one autonomous droning relationship determinators 226A, 226B.

Continuing with the preceding example, the autonomous droning relationship determinator 226 may determine, in this particular example, that an autonomous droning relationship persists so long as the lead vehicle 220 transmits commands (e.g., vehicle control commands) to the at least one following vehicle 210 on at least a regular interval (e.g., every second, every half second, every couple seconds, or other interval of time). The commands, upon receipt at an interface to a vehicle control computer 217 at the following vehicle 210, may cause the following drone vehicle 210 to control/alter its driving characteristics pursuant the commands. Examples of changes in driving characteristics include, but are not limited to, changing the speed of the drone vehicle 210, changing the direction of travel of the drone vehicle 210, and/or turning on/off headlights of the drone vehicle 210. Moreover, some commands may be to cause the drone vehicle 210 to hold steady its speed; although such commands might not expressly alter the driving characteristics of the vehicle 210, the command does cause the vehicle control computer 217 to control the vehicle 210. A person having ordinary skill in the art, after review of the entirety disclosed herein, will appreciate that the disclosure contemplates other examples of commands that alter the driving characteristics of a drone vehicle.

The lead vehicle 220 may generate commands and transmit them to one or more following vehicles 210. In one example, the driving analysis computer 224 of the lead vehicle 220 may take driving data as input and generate commands based on that driving data. For example, if the OBD interface 221 of the lead vehicle 220 indicates that the lead vehicle 220 is traveling at a speed of 45 mph in a particular cardinal direction (e.g., North), that information may be used to generate commands that a following drone vehicle 210 may process to adjust its speed and/or direction. A person having ordinary skill in the art, after review of the entirety disclosed herein, will appreciate that systems for autonomous droning are known and that aspects of these systems are incorporated into the illustrative system shown in FIG. 2.

In the preceding example, the autonomous droning relationship determinator 226B of a following vehicle 210 monitors for incoming commands on a regular interval, and if valid incoming commands are detected, the autonomous droning relationship determinator 226B determines that the following vehicle 210 is in an autonomous droning relationship. Likewise, a lead vehicle 220, using its short-range communications system (see FIG. 2), may regularly send/broadcast commands to one or more following drone vehicles; and while it is continuing to send such commands, may notify the autonomous droning relationship determinator 226A that the lead vehicle 220 is in an autonomous droning relationship.

In another example, the autonomous droning relationship determinator 226 may determine that the vehicle 210, 220 has entered into an autonomous droning relationship when an electronic handshake between the vehicles is sent, acknowledged, and/or established. With the handshake protocol completed, an autonomous droning relationship is established. Meanwhile, the autonomous droning relationship determinator 226 may monitor communications between its vehicle and the nearby vehicle to detect/determine when the autonomous droning relationship has terminated. The driving data (and optionally other data) collected while in the autonomous droning relationship may be sent to an autonomous droning reward calculator 702 for calculation of a possible reward amount.

In step 504, at or after termination of the autonomous droning relationship, an autonomous droning reward calculator 702 may calculate a reward amount. Alternatively, the autonomous droning reward calculator 702 may maintain a running count of the reward amount during the autonomous droning relationship. The running count may allow the autonomous droning reward calculator 702 to display in real-time, e.g., on a display screen located in the vehicle, the pending reward amount.

Figure 7:
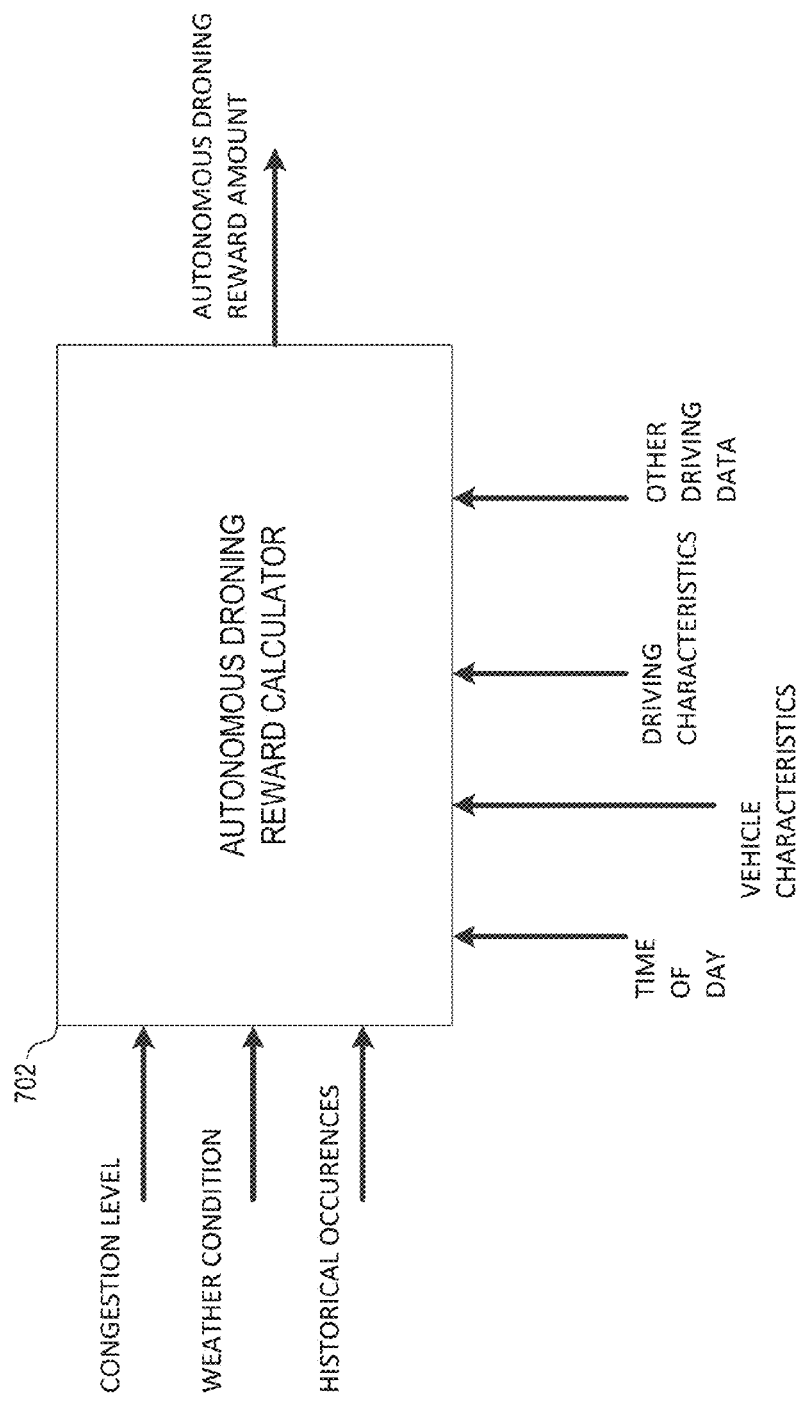
FIG. 7 is a diagram illustrating one example of an autonomous droning reward calculator in accordance with various aspects of the disclosure.

Referring to FIG. 7, an autonomous droning reward calculator 702 may calculate the reward amount using at least driving data. The driving data may include, but is not limited to, at least one of: speed of the lead vehicle, location of the lead vehicle, amount of time spent in the autonomous droning relationship, amount of distance traveled in the autonomous droning relationship, and/or other characteristics. Other examples of driving data include the time of day when the autonomous droning relationship exists, the following distance between the lead vehicle and a following drone vehicle (or in the case of multiple following vehicles, such as illustrated in FIG. 6, the distance between a vehicle and the vehicle immediately behind it), the vehicle's characteristics (e.g., vehicle type—SUV, sports car, sedan, convertible, etc., vehicle's turning radius, vehicle's maximum speed, vehicle time to accelerate from 0-60 mph, and other characteristics tied to the specific vehicle), driving risk characteristics/profile of the driver/operator of the lead vehicle 220, and other characteristics. For example, assuming numerous systems exist for automated droning, "System A" may use hardware and/or software algorithms different from that of competing "System B." As a result, each of the systems may react differently when used in the real world, and as such, will earn a driving risk characteristic/profile commensurate with the amount of risk associated with the particular system. Therefore, an autonomous droning reward calculator 702 may calculate a higher reward amount for "System A" than for "System B," in some examples. In another example where the lead vehicle 220 is manually driven, either the entire time of a trip or just a portion of the trip, by a human, the driving risk characteristics may be tied to the driver's driving risk score, which may take into account factors such as number of accidents, speeding ticket violations, number of submitted insurance claims, and other factors known for use in calculating a driving risk score.

In addition, referring to FIG. 7, other information may also be inputted into the autonomous droning reward calculator 702 for consideration in calculating a reward amount. For example, the congestion level (e.g., traffic) on a roadway where the lead vehicle 220 is being followed by drone vehicles may be an input to determining a reward amount. Other examples include, but are not limited to, the weather conditions the roadway, historical occurrences of incidents (e.g., vehicular accidents) on the roadway, and other factors related to the environment/surroundings in which the vehicle is operated. For example, the autonomous droning reward calculator 702 may adjust the reward amount based on the congestion level on the roadway being high. In one example, the autonomous droning reward calculator 702 may increase reward amounts during rush hour traffic to encourage vehicles 210 equipped with a vehicle control computer 217 to drone/follow a lead vehicle, thus alleviate traffic congestion. Congestion levels may be divided, in one example, into categories of high, medium, and low based on the whether the travel time through a particular roadway falls into the upper ⅓, middle ⅓, or lower ⅓ of possible travels times historically logged on that roadway. Likewise, weather conditions may play a role in determining the reward amount. In a fog situation, reward amounts may be very high in order to encourage both drone/following vehicles 210 and appropriate lead vehicles 220 (e.g., those vehicles that have been rated safe for operation in fog conditions, for example, because they are equipped with fog lights or other fog-ready equipment) to enter into an autonomous droning relationship.

The aforementioned external information from the preceding example of FIG. 7 may be stored at and retrieved from various data sources, such as an external traffic databases containing traffic data (e.g., amounts of traffic, average driving speed, traffic speed distribution, and numbers and types of accidents, etc.) about various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.), and insurance company databases containing insurance data (e.g., driver score, coverage amount, deductible amount, premium amount, insured status) for the vehicle, driver, and/or other nearby vehicles and drivers. The aforementioned external information may, in some examples, be wirelessly transmitted from a remote server and/or database to the vehicle 220 for consideration by the autonomous droning reward calculator 702. As explained earlier, drone vehicles 210 may leverage additional hardware and/or software capabilities of a lead vehicle 220 to gain access to the aforementioned information, when desired. For example, a lead vehicle 220 may receive, through its long-range communications circuitry 222 (or mobile phone 225), the information and forward it to drone vehicles 210 via their short-range communications 212 systems. As such, the vehicles 210, 220 may input the information into their autonomous droning reward calculator 702 for consideration.

FIG. 7 shows the autonomous droning reward calculator 702 receiving numerous inputs and outputting an autonomous droning reward amount. In some examples, the autonomous droning reward calculator 702 may be an application-specific integrated circuit (ASIC) designed to perform the functionality described herein. In other examples, autonomous droning reward calculator 702 may use a processing unit (e.g., comprising a computer processor, such as an Intel™ x86 microprocessor or other special-purpose processors) and computer-executable instructions stored in a memory to cause a driving analysis computer 214 to perform the steps described herein.

Referring to step 504, the autonomous droning reward calculator 702 may calculate a reward amount using one or more of the numerous driving data and other information described herein. In one example, the autonomous droning reward calculator 702 may increase the reward amount as the amount of distance traveled while in the autonomous droning relationship increases. In another example, the autonomous droning reward calculator 702 may increase the reward amount if the speed of the lead vehicle stays within a threshold speed range while in the autonomous droning relationship. In other words, if the vehicle speed of the caravan is kept within a safe range, a higher reward amount may be awarded. In yet another example, the autonomous droning reward calculator 702 may increase the reward amount if the location of the lead vehicle stays within a geographic region while in the autonomous droning relationship. In another example, the autonomous droning reward calculator 702 may increase the reward amount as the amount of time spent while in the autonomous droning relationship increases.

Figure 8:
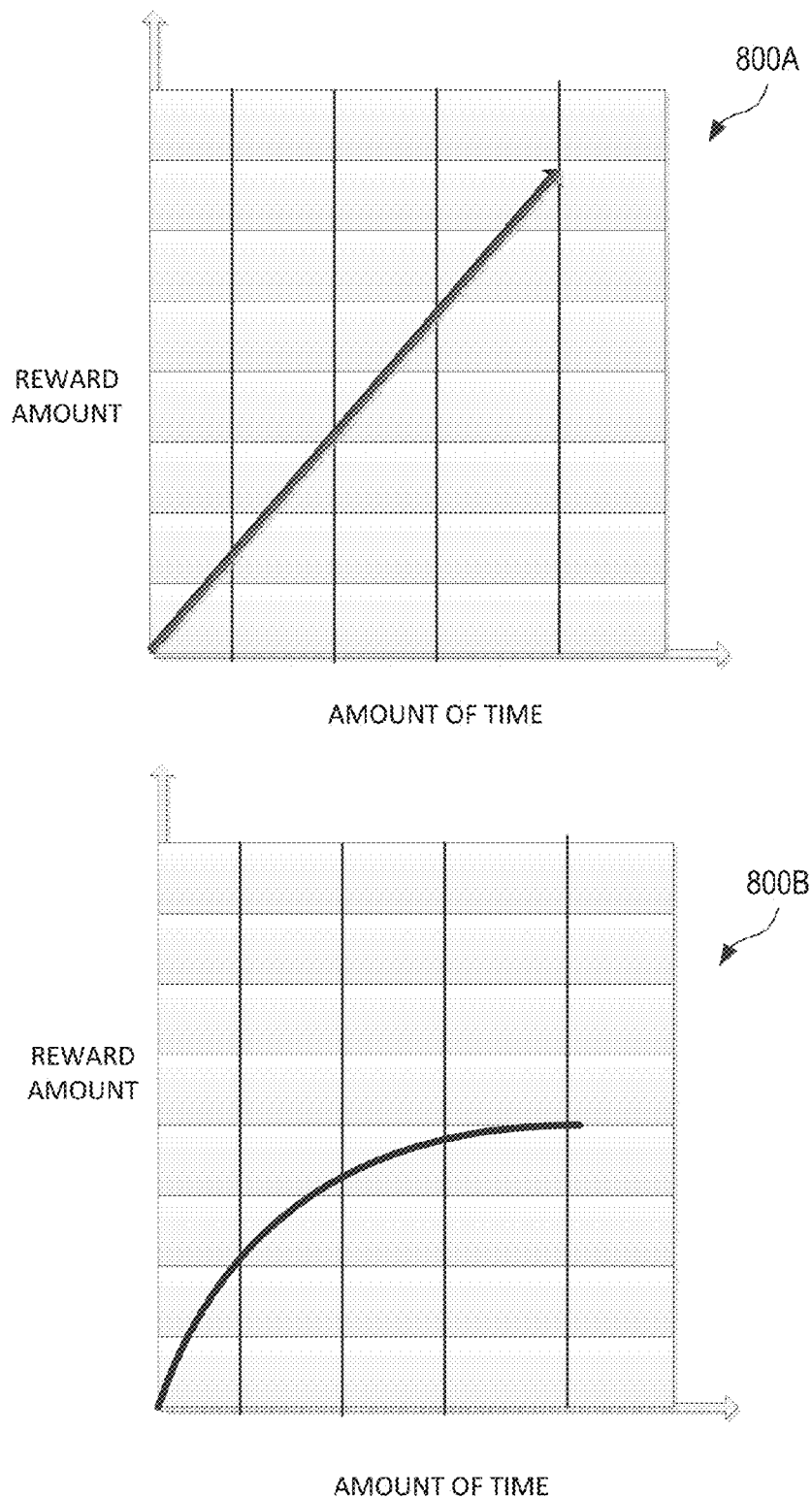
FIG. 8 illustrates graphical representations of illustrative formulas for calculating an autonomous droning reward amount based on one or more inputs, in accordance with various aspects of the disclosure.

FIG. 8 show a graphic illustration of the preceding example in which the autonomous droning reward calculator 702 increases the reward amount as the amount of time spent in while in the autonomous droning relationship increases. Graph 800A shows that in some examples, the autonomous droning reward calculator 702 may be configured to provide a reward amount in a linear proportion to the amount of time. As such, the graph is a straight line. Meanwhile, graph 800B shows an example where the autonomous droning reward calculator 702 may be configured to provide a reward amount as a function of the amount of time, but with a predefined maximum reward amount. As such, the relationship is defined such that once a drone vehicle 210 has been in an autonomous droning relationship for an extended period of time, the portion of the reward amount, which may be due to a measure of the amount of time in an autonomous droning relationship, remains generally the same value. Along these same lines, the autonomous droning reward calculator 702 may be configured with varying formulas/functions that establish relationships (e.g., linear, exponential, logarithmic, etc.) between the various inputs (e.g., such as those illustrated in FIG. 7) and the reward amount.

While in some examples the reward amount is a dollar amount (e.g., $10, $5.75, $0.98, etc.), in other examples, the reward amount may be a non-dollar amount. For example, the autonomous droning reward amount may be a percentage value (e.g., a 1.2% discount, a 0.5% discount, a 2.0% upcharge) applied with respect to a vehicle insurance policy, either prospectively and/or retrospectively to the beginning of the current policy term. In yet another example, the reward amount may be a voucher or coupon for goods and/or services.

In step 506, with the autonomous droning reward amount having been calculated in step 504, the reward amount is credited to the appropriate party, such as an account associated with the lead vehicle or a drone vehicle. In some examples, the lead vehicle 220 may receive the entire reward amount. In other examples, the reward amount may be divided and credited to all of the vehicle involved in the autonomous droning relationship. For example, a reward amount of $10 may be calculated in step 504, and $7 of it may be credited (in step 506) to a bank checking account associated with the lead vehicle 220, $2 of it may be credited (in step 506) to a bank checking account associated with the drone vehicle 210, and the remaining $1 may be credited to one or more government or private entities involved in the autonomous droning reward system. Examples of such government and/or private entities might include an insurance company providing the vehicle insurance policy to the lead vehicle, an insurance company providing vehicle insurance policy to the drone vehicle 210, a State's department of transportation, or other entity.

Figure 9:
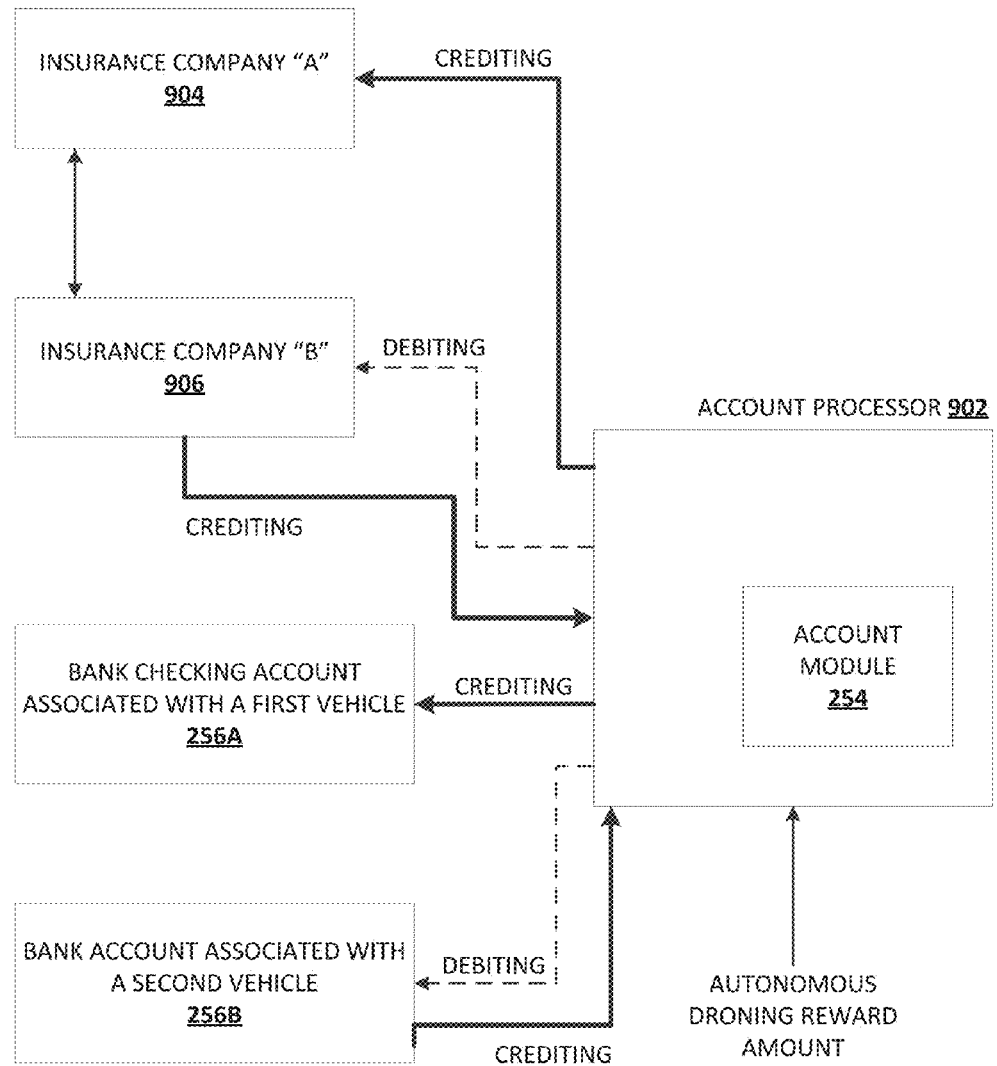
FIG. 9 is a diagram illustrating one example of an account processor in accordance with various aspects of the disclosure.

With reference to FIG. 9, an account processor 902 executing an account module 254 may serve to credit and/or debit, as appropriate, a rewards amount amongst various entities. In one example, a vehicle insurance company 904 insuring the lead vehicle 220 may provide the full reward amount. In other examples, the vehicle insurance company(s) 906 corresponding to one or more drone vehicles 210 following the lead vehicle may be responsible for crediting the autonomous droning reward amount to the lead vehicle's account 256A. In some hybrid-approaches, multiple insurance companies, including that of the lead vehicle and drone vehicle(s), may share the responsibility for awarding the autonomous droning reward amount. In other examples, the autonomous droning reward amount awarded to the lead vehicle's account may be provided by a drone vehicle (e.g., the account 256B associated with the drone vehicle may be debited accordingly).

Numerous different types of accounts are contemplated in accordance with various aspects of the disclosure. In some examples, a user's checking account at a financial institution may be credited and debited based on the autonomous droning reward amount calculated using at least driving data. The financial institution may be in communication, either directly or indirectly, with the autonomous droning reward system. As a result, usage-based rewards may be implemented in an autonomous droning reward system. In other examples, a vehicle's insurance policy account at a vehicle insurance company may be credited and debited based on the autonomous droning reward amount calculated using at least driving data. The insurance company may be in communication, either directly or indirectly, with the autonomous droning reward system.

Aspects of the disclosure pertain to analyzing driving data to determine driving characteristics associated with vehicle drafting relationships, determine driver rewards based on such characteristics, and allocating the driving rewards. Vehicle drafting, also referred to as slipstreaming, as used herein pertains to when two or more vehicles move in alignment to reduce the overall effect of drag due to exploiting the lead vehicle's slipstream. As a vehicle moves, high pressure is generated in front and low pressure behind. The difference in pressure creates a force known as drag. Drag force can account for a large amount of fuel consumption, especially at high speeds. The concept of drafting or slipstreaming is to utilize the regions of reduced pressure behind moving vehicles to lessen the oncoming drag experienced by the following vehicle, thereby reducing fuel consumption of the following vehicle. Slipstreaming can also reduce the fuel consumption of the lead vehicle but to a lesser extent than the lead vehicle. However, in order to realize appreciable savings in fuel consumption by engaging in drafting, vehicles may have to follow at distances less than legal following distances for manual driving. For example, a University of California-San Diego study determined that drag reduction was negligible at a distance of 288 feet at 65 mph and, therefore, show no increase in fuel savings. See Duan et al., Effects of Highway Slipstreaming on California Gas Consumption, MAE 171B-Mechanical Lab II, (Jun. 13, 2007) (hereinafter referred to as the "Duan Report"), which is hereby incorporated by reference herein in its entirety and a copy of which is filed in the Information Disclosure Statement concurrently filed with this application. However, autonomous driving and driving in autonomous droning relationships can allow for following at close distances in a safe manner. Accordingly, fuel savings associated with drafting can be realized utilizing autonomous driving and autonomous droning.

Figure 4:
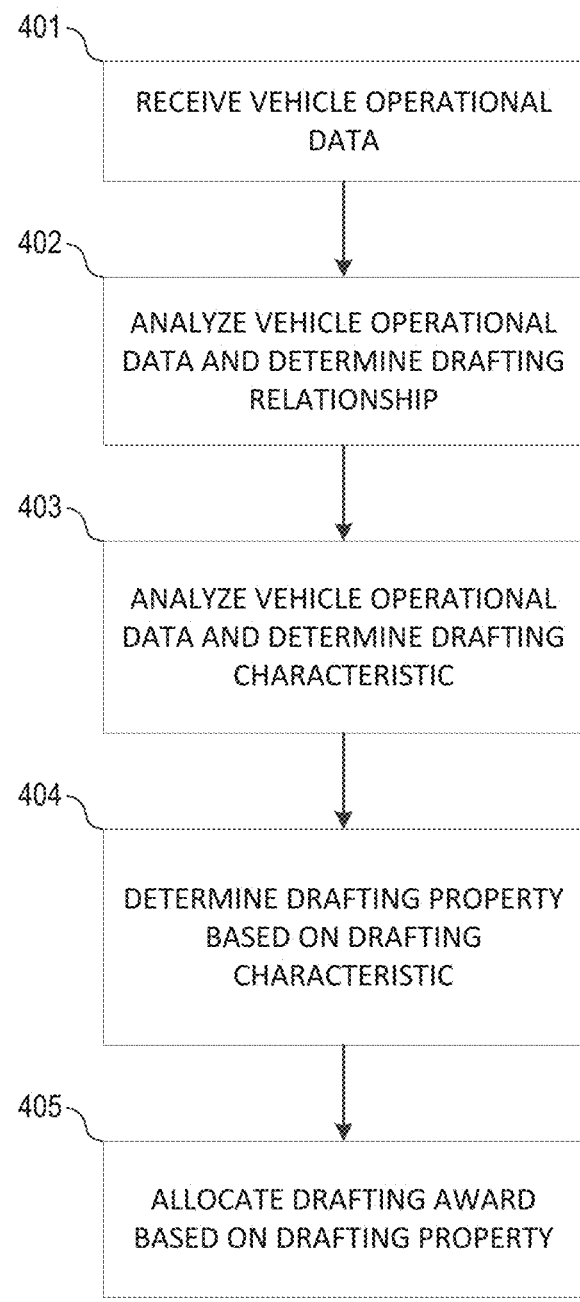
FIG. 4 is a flow diagram illustrating an example method of analyzing vehicle driving data, including receiving vehicle operational data pertaining to vehicles engaged in an autonomous droning relationship, determining a characteristic of an autonomous droning relationship between vehicles, and determining a property of an insurance policy using the characteristic of the autonomous droning relationship.

FIG. 4 is a flow diagram illustrating an example method of determining a drafting property associated with a first vehicle engaged in a drafting relationship and allocating a drafting reward based on the drafting property. This example method may be performed by one or more computing devices in a driving analysis system, such as vehicle-based driving analysis computers 214 and 224, a driving analysis computer 251 of a driving analysis server 250, user mobile computing devices 215 and 225, and/or other computer systems.

The steps shown in FIG. 4 describe performing analysis of vehicle operational data to determine drafting characteristics of vehicles engaged in a drafting relationship, determine a drafting property based on the drafting characteristic, and allocate a drafting award based on the drafting property. In step 401, vehicle operational data may be received from a first vehicle 210. As described above, a driving analysis computer 214 may receive and store vehicle driving data from a vehicle data acquiring component, including but not limited to the vehicle's internal computer systems and any combination of the vehicle's sensors 211 and/or communication systems. The data received in step 401 may include, for example, an identifier that the vehicle is engaged in a drafting relationship. The data received in step 401 may also include, for example, the location, speed, and direction of the vehicle 210, object proximity data from the vehicle's external cameras and proximity sensors, and data from the vehicle's various systems used to determine if the vehicle 210 is braking, accelerating, or turning, etc., and to determine the status of the vehicle's user-operated controls (e.g., head lights, turn signals, hazard lights, radio, phone, etc.), vehicle type, along with any other data collected by vehicle sensors 211 or data received from a nearby vehicle.

In step 402, the vehicle operational data is analyzed to determine whether the vehicle is engaged in a drafting relationship with another vehicle. For example, the driving data may include an identifier which indicates that the vehicle is engaged in a drafting relationship. In addition, for example, a driving analysis computer 214 in a first vehicle 210 may compare the driving data (e.g., location, speed, vehicle type) from its own vehicle sensors 211 (received in step 401) with the corresponding driving data (e.g., location, speed, vehicle) from a nearby vehicle 220. Based on the relative locations, speeds, and vehicle types of vehicles 210 and 220, the driving analysis computer 214 may determine that the vehicles are engaged in a drafting relationship. In an embodiment, the driving data of the nearby vehicle can be collected by the data acquiring component of the first vehicle 210 via, for example, vehicle V2V. In an embodiment, the driving data of the nearby vehicle can be received from the nearby vehicle directly. In an embodiment, the driving data of the nearby vehicle can be determined from vehicle sensors 211 of the first vehicle.

In step 403, the vehicle driving data received in steps 401 may be analyzed, and driving characteristics of the drafting relationship may be determined for the vehicles 210 and 220 based on the driving data. A driving characteristic of the drafting relationship may include any number actions or events performed by the vehicles in the relationship or driving conditions or circumstances impacting the drafting relationship. For example, a characteristic of a drafting relationship can include identification of a lead vehicle, identification of the following vehicle, vehicle spacing, vehicle speeds, vehicle types, miles-per-gallon readings, a weather condition, whether the vehicles are engaged in autonomous driving, and/or a driver safety rating. The driving characteristic of the drafting relationship can be determined by, for example, identifying the pertinent information from the received data, including actions or events performed by the vehicle or nearby vehicles. For example, the driving data may include a data point that identifies a vehicle as a lead vehicle in a drafting relationship. The driving characteristic can be determined by calculations using selected driver data. For example, vehicle spacing can be calculated from vehicle location data by, for example, identifying the locations of the respective vehicles and performing an analysis to determine the distance between the vehicles. The driving characteristic can also be identified by comparing the driving data associated with a first vehicle with the corresponding driving data of the nearby vehicle. Based on information from, for example, the relative locations, speeds, and vehicle types of vehicles 210 and 220, the driving analysis computer 214 may determine a driving characteristic of the drafting relationship involving the two vehicles. As used herein, a driving characteristic of a drafting relationship may also be referred to as a drafting characteristic.

In step 404, a drafting property is determined based on the drafting characteristic. As used herein, a drafting property can include any measure of efficiency realized from the drafting relationship. For example, a drafting property can include a drafting fuel savings rate, a percentage increase in miles-per-gallon, and a drafting fuel savings amount. In various embodiments, the drafting property can be determined from algorithms or identified from predetermined correlations based on the drafting characteristics. For example, where the drafting property is a drafting fuel savings amount, the drafting fuel savings amount can be determined by subtracting from a miles-per-gallon reading taken while the vehicle is drafting a miles-per-gallon reading taken while the vehicle is not drafting to determine a drafting miles-per-gallon savings rate and dividing a distance traveled by the vehicle by the first drafting miles-per-gallon savings rate. In addition, for example, the drafting property can be determined from a correlation of vehicle spacing vs. an increase in miles-per-gallon for specific vehicle. Such correlations can be based on, for example, vehicle lead type, vehicle following type, vehicle spacing, and vehicle speed. Such correlations can be prepared by, for example, methods including modeling and or wind tunnel experiments. Example methods for preparing such correlations include those disclosed in the Duan Report. Correlations for use in determining drafting properties can be stored on a driving data database 252.

In step 405, the driving analysis computer can allocate a drafting reward based on the drafting property. For example, drafting reward (e.g., remunerative payment) can include at least one of a cash payment, a carbon credit, a fuel credit, a tax credit, a rebate, and at least a portion of a drafting fuel savings amount associated with the first vehicle. The drafting amount can be allocated to an associated with the vehicle or vehicle owner to which the allocation is made. In addition, the reward can be allocated at regular intervals while the vehicles are engaged in the drafting relationship. For example, a reward can be allocated every second, minute, or mile in which the vehicles are engaged in the drafting relationship. The drafting reward can be determined according to rules or agreements established between drivers and/or owners of the vehicles. The system can further be configured to cause the reward to be received by the party to which it is allocated. For example, if the reward is a payment, the system can cause the payment to be debited from a bank account associated with the following vehicle and credited to the account of the lead vehicle.

In various embodiments, the steps of 401-405 can be applied to a caravan of vehicles engaged in a drafting relationship. In an embodiment, a following vehicle allocates a reward to the vehicle it is following, which may in turn be following another vehicle. In such examples, rewards provided by a vehicle can be offset by reward received by the vehicle.

In various embodiments, the system can notify a vehicle engaged in a drafting relationship of a drafting characteristic, a drafting property, and/or drafting reward. In an embodiment, the notification can be sent to the owner of the vehicle or entity which is authorized to receive the notifications. The notifications can be made in real-time. In addition, the notifications can be sent to, for example, a mobile phone or other device associated with the vehicle, owner, or authorized party.

In some examples, certain functionality may be performed in vehicle-based driving analysis computers 214 and 224, while other functionality may be performed by the driving analysis computer 251 at the driving analysis server 250. For instance, vehicle-based driving analysis computers 214 and 224 may continuously receive and analyze driving data for their own vehicles 210 and 220 and nearby vehicles (via V2V communications), and may determine driving characteristics (e.g., autonomous driving characteristics, drafting characteristics, etc.) for their own vehicles 210 and 220 and/or the other nearby vehicles. After the vehicle-based driving analysis computers 214 and 224 have determined the driving characteristics, indications of these characteristics may be transmitted to the server 250 so that the driving analysis computer 251 can perform the insurance policy determinations and adjustments based on the driving characteristics. Thus, the driving analysis server 250 may be optional in certain embodiments, and some or all of the driving analyses may be performed within the vehicles themselves.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention. In addition, where reference has been made in this disclosure to items in the figures, in some instances the alphabetic suffix (e.g., "A" or "B") of a reference number has been omitted when it is desired to generally reference (e.g., "226") the item without specificity as to which of the plurality of items corresponding to the same base reference number.

What is claimed is:

1. An autonomous droning reward system comprising:
    a vehicle operational data collector, wherein the vehicle operational data collector is configured to collect driving data from at least one of vehicle sensors, vehicle OBD systems, and vehicle-to-vehicle communication systems; and
    an autonomous droning reward device, comprising
    a processing unit comprising at least one computer processor;
    a memory unit; and
    a wireless receiver;
    wherein an autonomous droning reward device is configured to receive, via the wireless receiver, the driving data;
    determine, from the driving data, whether a lead vehicle is in an autonomous droning relationship with at least one following vehicle, wherein the driving data indicates that lead vehicle is in the autonomous droning relationship so long as the lead vehicle transmits commands to the at least one following vehicle on at least a regular interval and the at least one following vehicle uses the commands to follow the lead vehicle and automate driving based on the driving of the lead vehicle;
    calculate a reward amount based on at least that the lead vehicle is in the autonomous droning relationship;
    determine an account associated with the lead vehicle; and
    credit the account associated with the lead vehicle by the reward amount.

2. The autonomous droning reward system of claim 1, wherein one of the at least one following vehicle is a drone vehicle comprising:
    a short-range wireless communications circuitry configured to receive commands generated by the lead vehicle; and
    an interface to a vehicle control computer of the drone vehicle, wherein the commands are sent to the vehicle control computer through the interface to cause the drone vehicle to alter its driving characteristics.

3. The autonomous droning reward system of claim 1, wherein the lead vehicle is operated on a roadway, and wherein the autonomous droning reward device is further configured to:
    adjust the reward amount based on at least one of congestion level on the roadway, weather conditions on the roadway, and historical occurrence of incidents on the roadway.

4. The autonomous droning reward system of claim 1, wherein the autonomous droning reward device is further configured to:
    adjust the reward amount based on at least one of time of day when the lead vehicle is operated, vehicle characteristics of the lead vehicle, and driving risk characteristics of the lead vehicle.

5. The autonomous droning reward system of claim 1, wherein the driving data comprises at least one of: speed of the lead vehicle, location of the lead vehicle, amount of time spent in the autonomous droning relationship, and amount of distance traveled in the autonomous droning relationship, wherein the autonomous droning reward device is further configured to:
- increase the reward amount as the amount of time spent in the autonomous droning relationship increases;
- increase the reward amount as the amount of distance traveled in the autonomous droning relationship increases;
- increase the reward amount if the speed of the lead vehicle stays within a threshold speed range while in the autonomous droning relationship; and
- increase the reward amount if the location of the lead vehicle stays within a geographic region while in the autonomous droning relationship.

6. The autonomous droning reward system of claim 1, further comprising:
- a short-range wireless communications circuitry configured to communicate commands between the lead vehicle and the at least one following vehicle;
- a long-range wireless communications circuitry configured to communicate the driving data; and
- an interface to an on-board diagnostic port of the lead vehicle configured to receive driving data.

7. The autonomous droning reward system of claim 1, wherein the account is an auto insurance policy account, and wherein the reward amount is a dollar amount at least partially credited against a premium due on the auto insurance policy account.

8. The autonomous droning reward system of claim 1, wherein the autonomous droning reward device is further configured to:
- determine an account associated with one of the at least one following vehicle; and
- debit the account associated with the one of the at least one following vehicle by the reward amount.

9. The autonomous droning reward system of claim 1, wherein the autonomous droning reward device is further configured to:
- determine an account associated with one of the at least one following vehicle; and
- credit the account associated with the one of the at least one following vehicle by no more than the reward amount.

10. The autonomous droning reward system of claim 1, wherein the autonomous droning reward device is further configured to:
- apply a percentage discount to an insurance policy account of the at least one following vehicle a vehicle insurance policy.

11. The autonomous droning reward system of claim 1, further comprising:
- a display screen configured to display at least the reward amount in the lead vehicle.

12. The autonomous droning reward system of claim 1, further comprising a driving analysis computing device configured to:
- determine a drafting property associated with the at least one following vehicle; and
- calculate a drafting reward based on the drafting property associated with the at least one following vehicle.

13. A method comprising:
- receiving, by a wireless receiver of an autonomous droning reward device, driving data collected by a vehicle operational data collector, wherein the vehicle operational data collector is configured to collect driving data from at least one of vehicle sensors, vehicle OBD systems, and vehicle-to-vehicle communication systems;
- determining, by a processing unit of the autonomous droning reward device, from the driving data whether a lead vehicle is in an autonomous droning relationship with at least one drone vehicle, wherein the driving data indicates that lead vehicle is in the autonomous droning relationship so long as the lead vehicle transmits commands to the at least one following vehicle on at least a regular interval and the at least one following vehicle uses the commands to follow the lead vehicle and automate driving based on the driving of the lead vehicle;
- calculating, by a processing unit of the autonomous droning reward device, a reward amount based on at least that the lead vehicle is in the autonomous droning relationship; and
- crediting by the reward amount one or more accounts associated with at least one of the lead vehicle and one of the at least one following vehicle.

14. The method of claim 13, wherein the crediting is performed by an account processor.

15. The method of claim 13, further comprising:
- adjusting, by the autonomous droning reward device, the reward amount based on at least one of congestion level on a roadway traveled by the lead vehicle, weather conditions on the roadway, historical occurrence of incidents on the roadway, time of day when the lead vehicle is operated, vehicle characteristics of the lead vehicle, and driving risk characteristics of the lead vehicle.

16. The method of claim 13, wherein the one or more accounts includes an auto insurance policy account, and wherein the reward amount is a dollar amount at least partially credited against a premium due on the auto insurance policy account.

* * * * *